United States Patent
Schmitt et al.

(10) Patent No.: US 11,738,682 B2
(45) Date of Patent: Aug. 29, 2023

(54) COMMUNICATING VEHICLE INFORMATION TO PEDESTRIANS

(71) Applicant: Motional AD LLC, Boston, MA (US)

(72) Inventors: Paul Schmitt, Merrimack, NH (US); Emilio Frazzoli, Newton, MA (US); Cristhian Guillermo Lizarazo Jimenez, Boston, MA (US); Luke Fletcher, South Boston, MA (US)

(73) Assignee: Motional AD LLC, Boston, MA (US)

( * ) Notice: Subject to any disclaimer, the term of this patent is extended or adjusted under 35 U.S.C. 154(b) by 98 days.

(21) Appl. No.: 17/481,018

(22) Filed: Sep. 21, 2021

(65) Prior Publication Data

US 2022/0111871 A1    Apr. 14, 2022

Related U.S. Application Data

(60) Provisional application No. 63/197,146, filed on Jun. 4, 2021, provisional application No. 63/174,991, filed (Continued)

(51) Int. Cl.
*B60W 60/00* (2020.01)
*B60W 30/18* (2012.01)
(Continued)

(52) U.S. Cl.
CPC ......... *B60W 60/0017* (2020.02); *B60Q 1/525* (2013.01); *B60Q 5/006* (2013.01);
(Continued)

(58) Field of Classification Search
CPC ............ B60W 60/0017; B60W 10/20; B60W 30/181; B60W 30/18163; B60W 40/04;
(Continued)

(56) References Cited

U.S. PATENT DOCUMENTS

| 9,904,375 | B1 * | 2/2018 | Donnelly | B60Q 1/50 |
| 2014/0267398 | A1 * | 9/2014 | Beckwith | G06T 19/006 |
| | | | | 345/633 |

(Continued)

FOREIGN PATENT DOCUMENTS

| EP | 3576069 A1 * | 12/2019 | G08G 1/166 |
| GB | 2579025 | 6/2020 | |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

*Primary Examiner* — Donald J Wallace
*Assistant Examiner* — Daniel M. Robert
(74) *Attorney, Agent, or Firm* — Fish & Richardson P.C.

(57) ABSTRACT

Among other things, techniques are described for expressive vehicle systems. These techniques may include obtaining, with at least one processor, data associated with an environment, the environment comprising a vehicle and at least one object; determining an expressive maneuver including a deceleration of the vehicle such that the vehicle stops at least a first distance away from the at least one object and the vehicle reaches a peak deceleration when the vehicle is a second distance away from the at least one object; generating data associated with control of the vehicle based on the deceleration associated with the expressive maneuver; and transmitting the data associated with the control of the vehicle to cause the vehicle to decelerate based on the deceleration associated with the expressive maneuver.

33 Claims, 29 Drawing Sheets

Related U.S. Application Data on Apr. 14, 2021, provisional application No. 63/089,534, filed on Oct. 8, 2020.

(51) Int. Cl.

| | | |
|---|---|---|
| *B60Q 1/50* | (2006.01) | |
| *B60Q 5/00* | (2006.01) | |
| *B60W 10/20* | (2006.01) | |
| *B60W 40/04* | (2006.01) | |

(52) U.S. Cl.
CPC .......... *B60W 10/20* (2013.01); *B60W 30/181* (2013.01); *B60W 30/18163* (2013.01); *B60W 40/04* (2013.01); *B60W 60/00274* (2020.02); *B60W 2552/00* (2020.02); *B60W 2554/4026* (2020.02); *B60W 2554/4029* (2020.02); *B60W 2554/4044* (2020.02); *B60W 2554/80* (2020.02); *B60W 2720/10* (2013.01)

(58) Field of Classification Search
CPC ....... B60W 60/00274; B60W 2552/00; B60W 2554/4026; B60W 2554/4029; B60W 2554/4044; B60W 2554/80; B60W 2720/10; B60W 2552/53; B60W 2720/103; B60W 2720/106; B60W 60/001; B60W 60/0011; B60W 30/08; B60W 30/143; B60W 10/18; B60W 30/18109; B60W 40/02; B60W 40/105; B60W 2050/0005; B60W 2520/04; B60W 2554/4041; B60W 2556/45; B60Q 1/525; B60Q 5/006; B60Q 1/547; B60Q 1/507; B60Q 1/326; B60Q 1/543; B60Q 5/005; G08G 1/166; G08G 1/0112
See application file for complete search history.

(56) References Cited

U.S. PATENT DOCUMENTS

| | | | |
|---|---|---|---|
| 2015/0268665 A1* | 9/2015 | Ludwick | B60Q 5/008 |
| | | | 701/23 |
| 2016/0370194 A1* | 12/2016 | Colijn | G08G 1/205 |
| 2017/0291602 A1* | 10/2017 | Newman | G08G 1/166 |
| 2017/0370734 A1* | 12/2017 | Colijn | G01C 21/34 |
| 2018/0174461 A1* | 6/2018 | Ito | G08G 1/166 |
| 2018/0286242 A1* | 10/2018 | Talamonti | B62D 15/025 |
| 2018/0326982 A1* | 11/2018 | Paris | B60W 30/18154 |
| 2019/0061750 A1* | 2/2019 | Tamura | B60W 30/09 |
| 2019/0066003 A1* | 2/2019 | Dyer | G06Q 10/025 |
| 2019/0137290 A1* | 5/2019 | Levy | G05D 1/0088 |
| 2019/0146519 A1* | 5/2019 | Miura | G06V 40/103 |
| | | | 701/28 |
| 2019/0263422 A1* | 8/2019 | Enthaler | G07C 9/00 |
| 2019/0347492 A1* | 11/2019 | Morimura | B60W 40/04 |
| 2020/0122694 A1* | 4/2020 | Eigel | B60W 30/09 |
| 2020/0156535 A1* | 5/2020 | Lee | G06V 40/10 |
| 2020/0180637 A1 | 6/2020 | Oh et al. | |
| 2020/0223352 A1* | 7/2020 | Toshio Kimura | B60Q 1/549 |
| 2020/0231144 A1* | 7/2020 | Ueda | B60T 7/12 |
| 2020/0247434 A1 | 8/2020 | Kim et al. | |
| 2020/0307572 A1* | 10/2020 | Doi | B60W 50/0097 |
| 2020/0349836 A1* | 11/2020 | Shibata | B60Q 5/005 |
| 2021/0197863 A1* | 7/2021 | Hotta | B60K 35/00 |

FOREIGN PATENT DOCUMENTS

| | | |
|---|---|---|
| JP | 2004-358998 | 12/2004 |
| JP | 2008247111 A * | 10/2008 |
| JP | 2019-089516 | 6/2019 |
| JP | 2019-197467 | 11/2019 |
| JP | 2020-125106 | 8/2020 |
| KR | 10-0527494 | 11/2005 |
| KR | 10-2020-0022053 | 3/2020 |
| WO | WO 2019/046375 | 3/2019 |

* cited by examiner

US 11,738,682 B2

COMMUNICATING VEHICLE INFORMATION TO PEDESTRIANS

CROSS-REFERENCE TO RELATED APPLICATIONS

This application claims priority to U.S. Provisional Application No. 63/197,146, filed Jun. 4, 2021, U.S. Provisional Application No. 63/174,991, filed Apr. 14, 2021, and U.S. Provisional Application No. 63/089,534, filed Oct. 8, 2020, the entire contents of each of which are incorporated herein by reference.

FIELD OF THE INVENTION

This description relates to communicating vehicle information to pedestrians, cyclists, traffic control agents, human drivers, etc., using an expressive vehicle system.

BACKGROUND

Pedestrians and human drivers heavily rely on gestures from other human drivers. For example, as a vehicle approaches a crosswalk, pedestrians often wait for a nod or indication from the driver of the vehicle that it is safe for them to cross. Absent this indication by the driver, the pedestrian may feel uncomfortable walking in front of the vehicle.

In some vehicles, a driver may not be present (e.g., autonomous vehicles), which can make the pedestrian even more uncomfortable walking in the vicinity of the vehicle—let alone directly in the vehicle's path.

DETAILED DESCRIPTION

Figure 1:
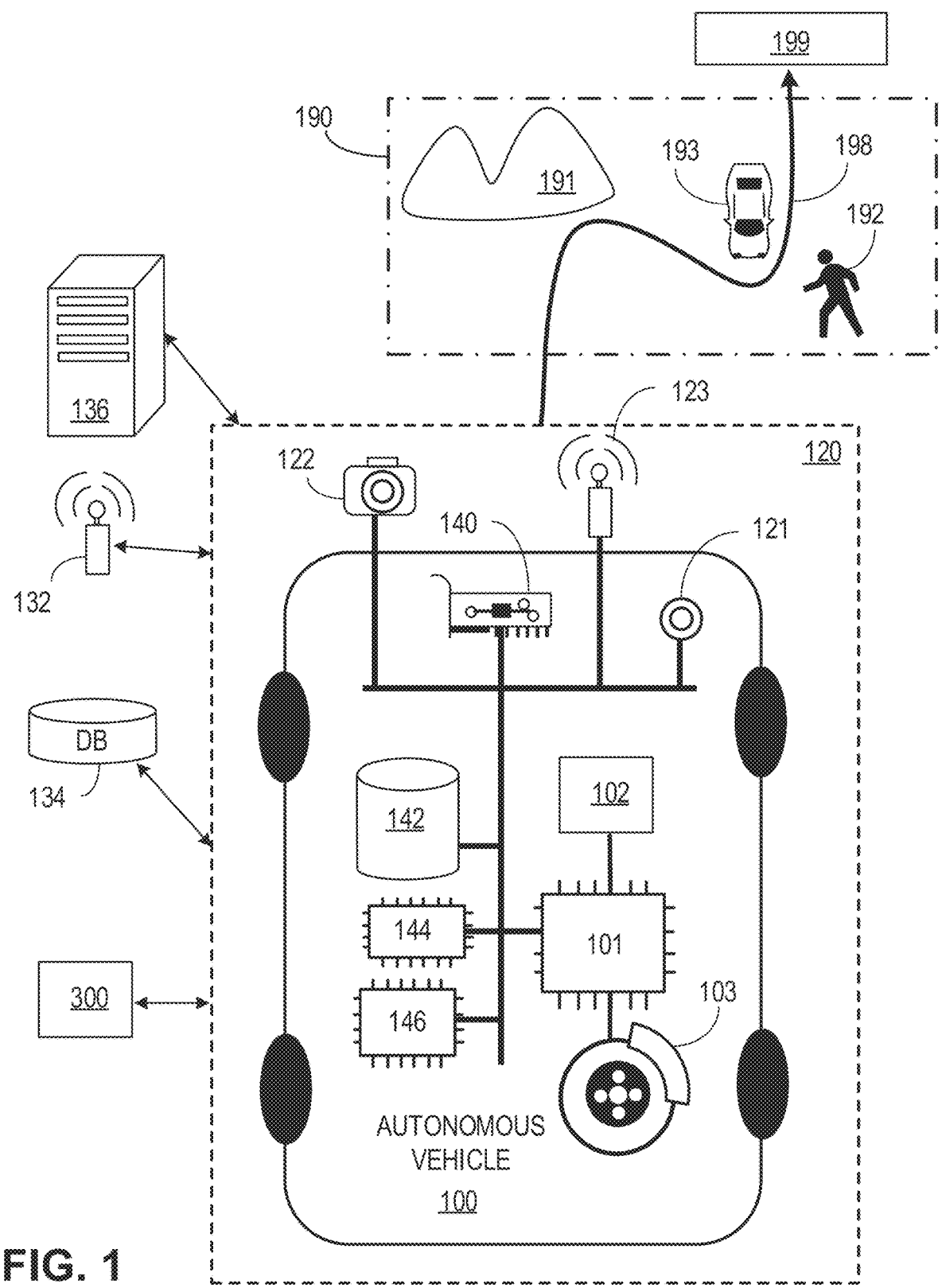
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Expressive Vehicle System General Overview In addition to gestures, pedestrians may also rely upon vehicle motions and position relative to the pedestrian to determine intent. In addition to communicating the vehicle's intention to stop, this concept can be applied to communicating the intent to "drive through" or not stop. In addition, the concept may be applied to communicating intent at four way stops to other drivers. In addition, the concept may be applied to merging intent.

Expressive vehicle systems enable a pedestrian to be aware of an operational state of a vehicle by communicating an indication to them. The operational state may be a state according to which a vehicle may operate using one or more driving maneuvers such as, for example, inching forward toward a stop line. Furthermore, the indication may be a sound. For example, by transmitting a sound that decreases in frequency as the vehicle approaches (e.g., to mimic engine RPM reduction sounds) and stops, the pedestrian may perceive the vehicle as slowing down.

Furthermore, the vehicle may begin to stop at a further distance from the pedestrian than a typical human driver would, reach a peak deceleration at a further distance from the pedestrian, and come to a complete stop at a further distance from the pedestrian. Additionally, the vehicle may also have a different deceleration profile than a vehicle that is not using an expressive vehicle system. For example, a semi-autonomous vehicle may detect an object ahead but may slow down with a particular deceleration profile, while the same semi-autonomous vehicle with the expressive vehicle system would slow down with a different deceleration profile. In this way, the deceleration profile (when to apply the brakes, how fast to slow down the vehicle, how close to the object the vehicle should be, etc.) is dependent on the object.

Some of the advantages of these techniques include conveying the operational state of the vehicle to pedestrians in an environment of the vehicle. This increases the likelihood that the movement of the vehicle is interpreted correctly by the pedestrian.

The systems described in this application also provide controlling of the vehicle in response to the presence of, velocity of, and/or trajectory of, the object. This is achieved via various on board sensors of the vehicle. The vehicle can then be controlled to decelerate with a particular deceleration profile to safely stop well ahead of the object.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver or movement). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical data about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
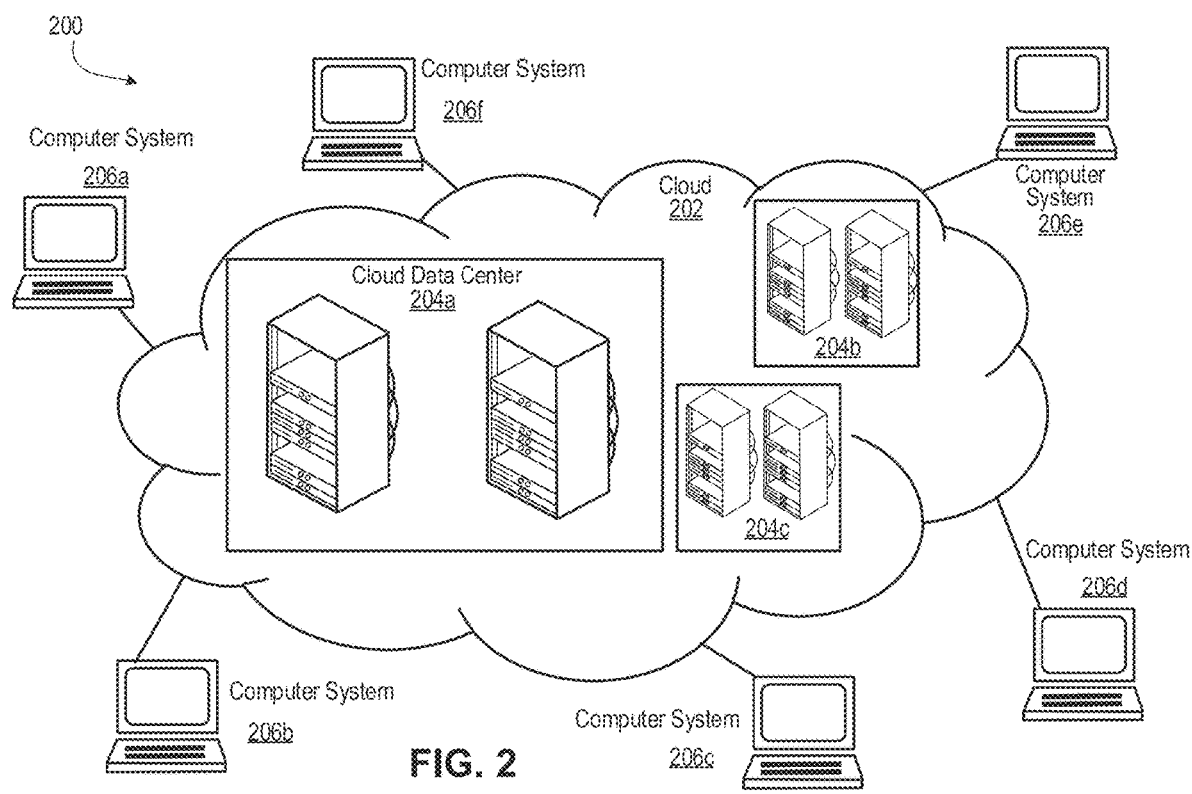
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
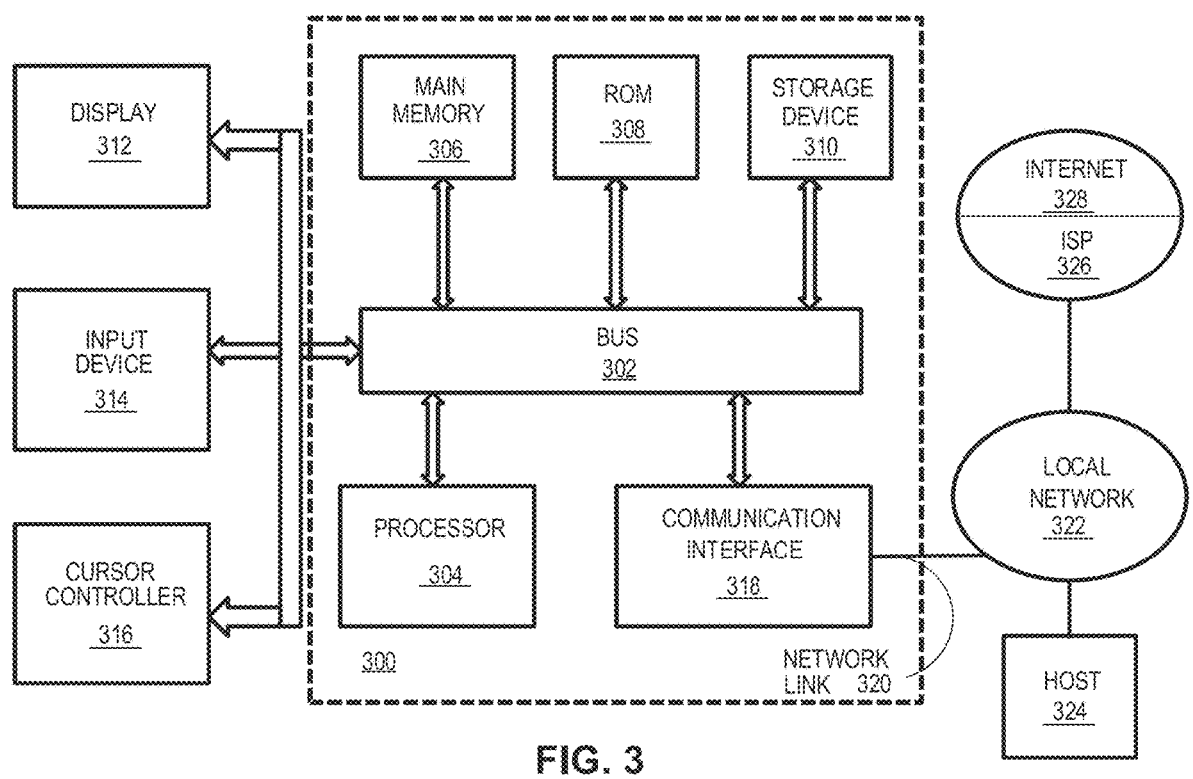
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
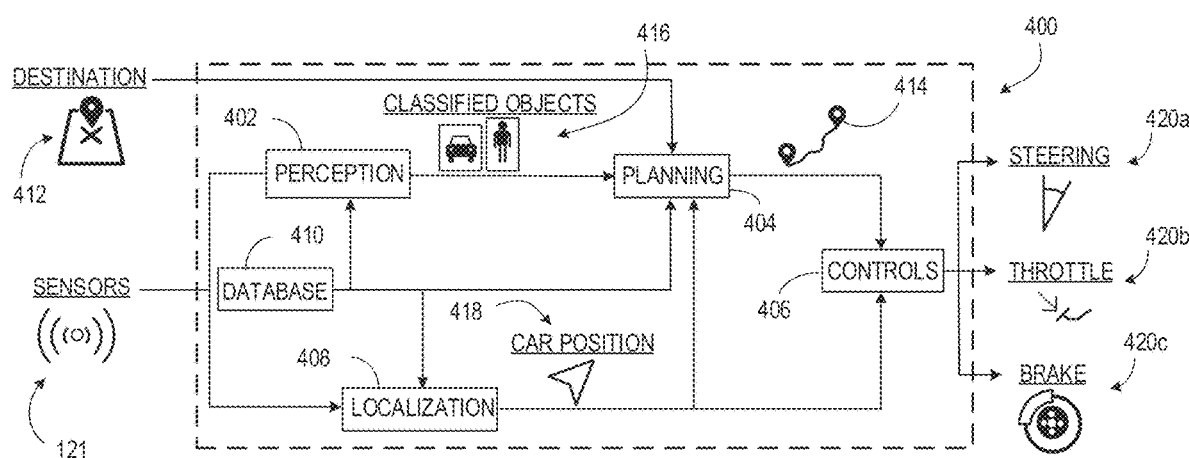
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
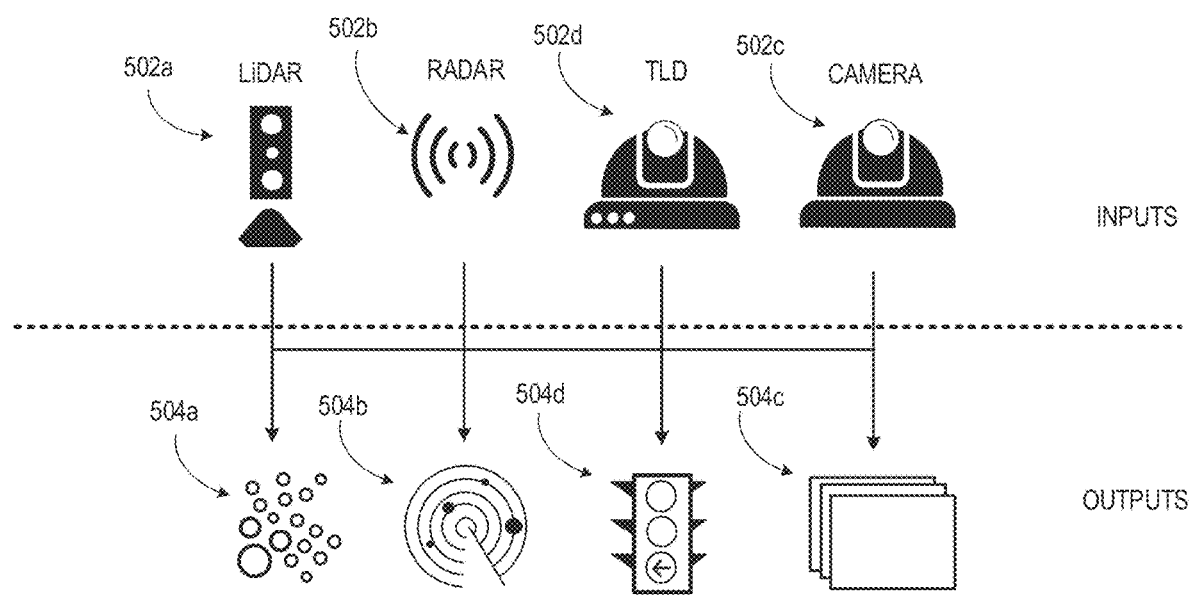
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation data provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
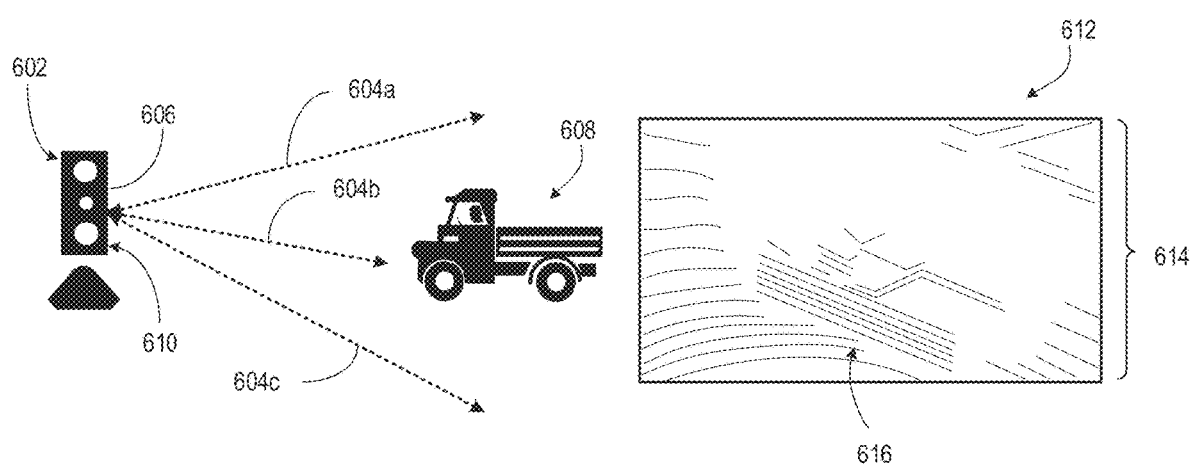
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
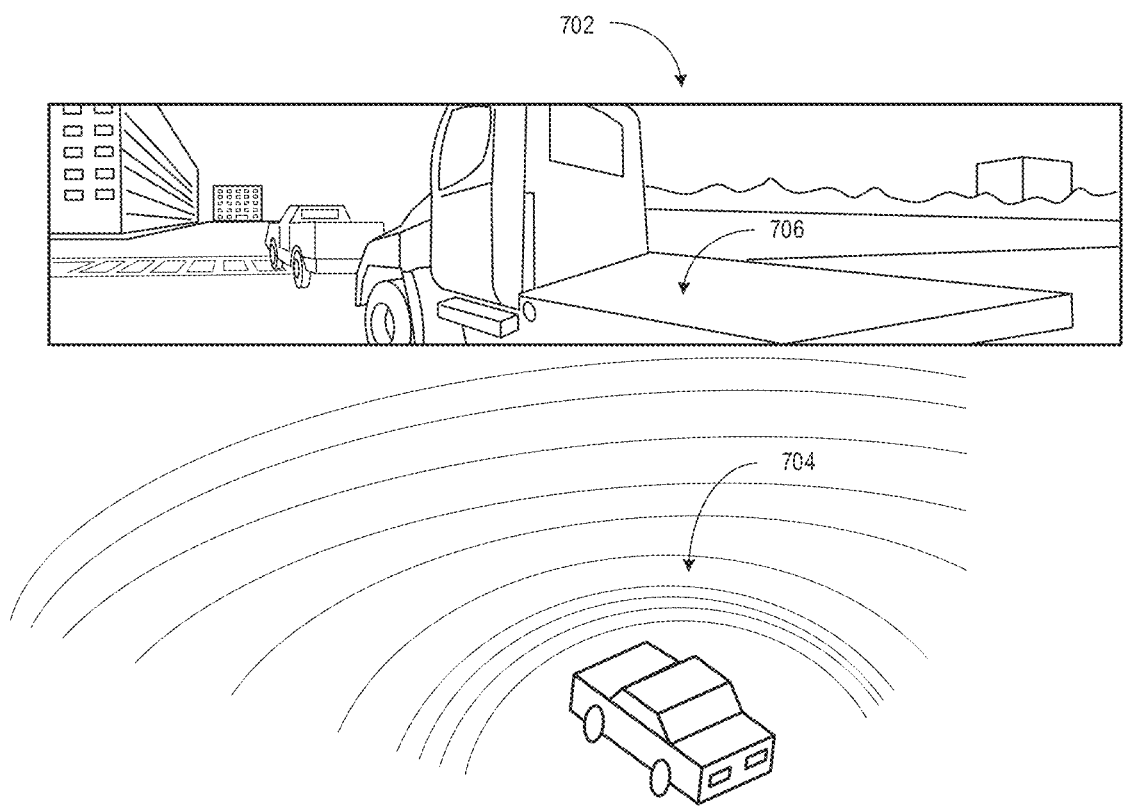
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
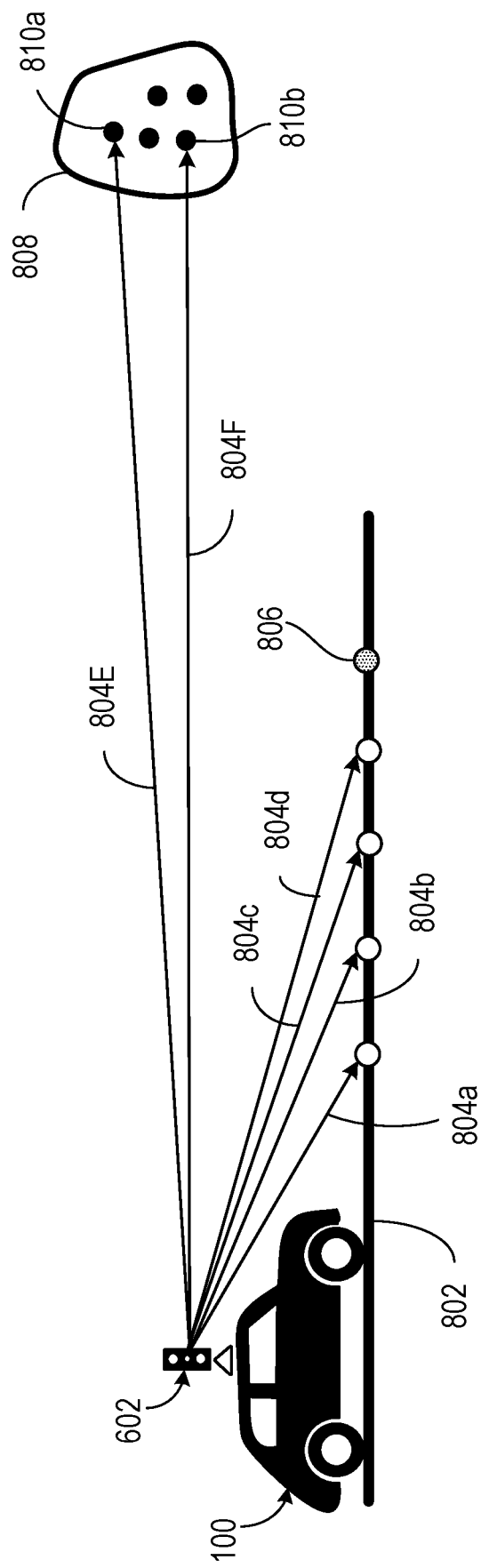
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
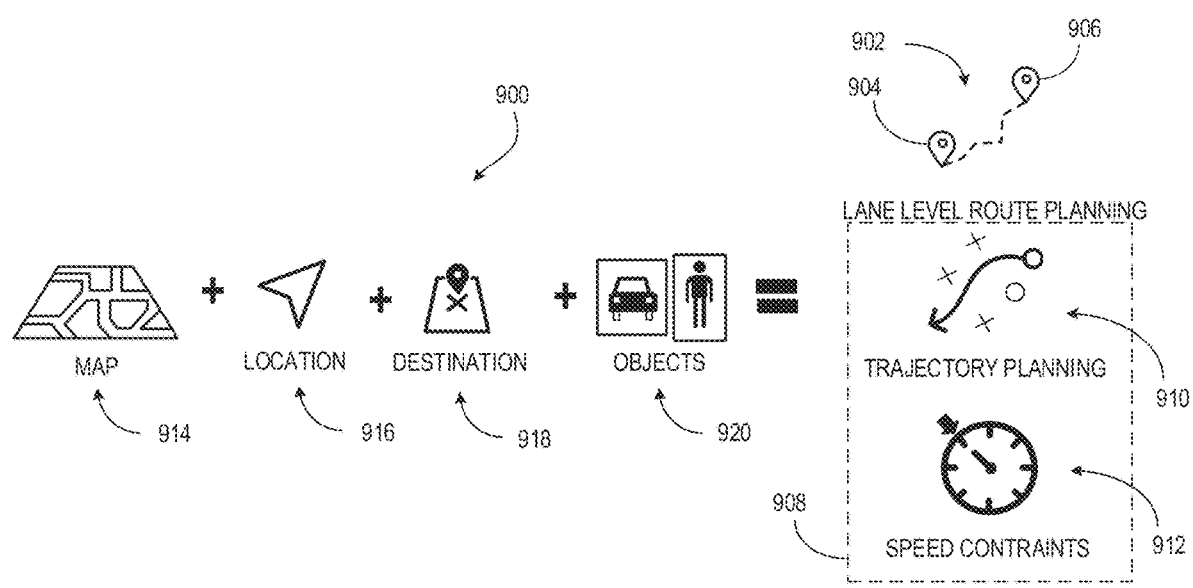
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to determine a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or un- expected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Autonomous Vehicle Control

Figure 10:
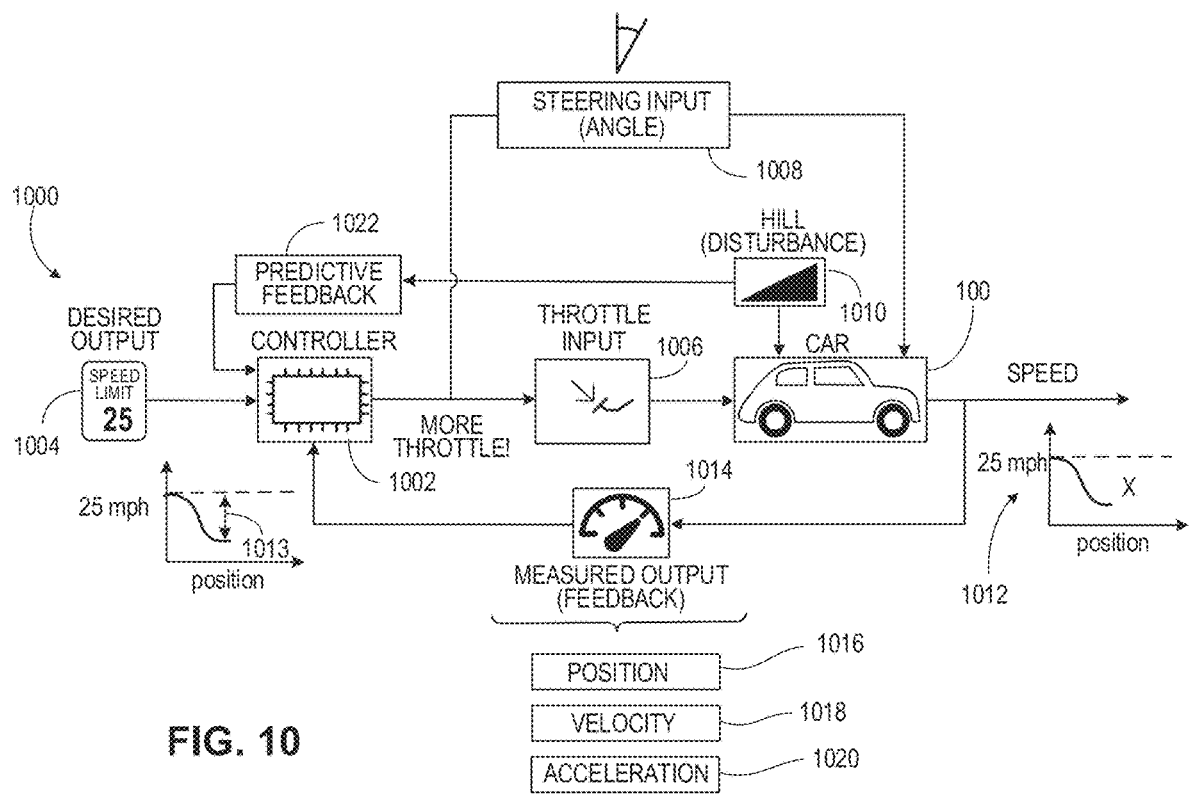
FIG. 10 shows a block diagram of the inputs and outputs of a control module.

FIG. 10 shows a block diagram 1000 of the inputs and outputs of a control module 406 (e.g., as shown in FIG. 4). A control module operates in accordance with a controller 1002 which includes, for example, one or more processors (e.g., one or more computer processors such as microprocessors or microcontrollers or both).

In an embodiment, the controller 1002 receives data representing a desired output 1004. The desired output 1004 typically includes a velocity, e.g., a speed and a heading. The desired output 1004 can be based on, for example, data received from a planning module 404 (e.g., as shown in FIG. 4). In accordance with the desired output 1004, the controller 1002 produces data usable as a throttle input 1006 and a steering input 1008. The throttle input 1006 represents the magnitude in which to engage the throttle (e.g., acceleration control) of an AV 100, e.g., by engaging the accelerator pedal, or engaging another throttle control, to achieve the desired output 1004. In some examples, the throttle input 1006 also includes data usable to engage the brake (e.g., deceleration control) of the AV 100. The steering input 1008 represents a steering angle, e.g., the angle at which the steering control (e.g., steering wheel, steering angle actuator, or other functionality for controlling steering angle) of the AV should be positioned to achieve the desired output 1004.

In an embodiment, the controller 1002 receives feedback that is used in adjusting the inputs provided to the throttle and steering. For example, if the AV 100 encounters a disturbance 1010, such as a hill, the measured speed 1012 of the AV 100 is lowered below the desired output speed. In an embodiment, any measured output 1014 is provided to the controller 1002 so that the necessary adjustments are performed, e.g., based on the differential 1013 between the measured speed and desired output. The measured output 1014 includes measured position 1016, measured velocity 1018, (including speed and heading), measured acceleration 1020, and other outputs measurable by sensors of the AV 100.

In an embodiment, information about the disturbance 1010 is detected in advance, e.g., by a sensor such as a camera or LiDAR sensor, and provided to a predictive feedback module 1022. The predictive feedback module 1022 then provides information to the controller 1002 that the controller 1002 can use to adjust accordingly. For example, if the sensors of the AV 100 detect ("see") a hill, this information can be used by the controller 1002 to prepare to engage the throttle at the appropriate time to avoid significant deceleration.

Figure 11:
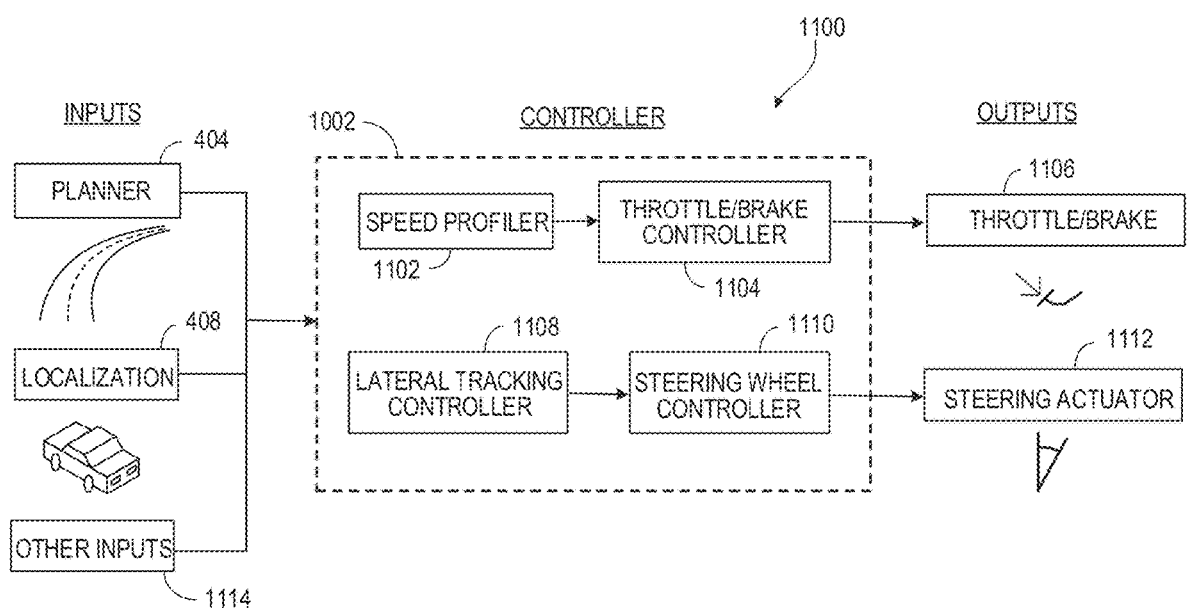
FIG. 11 shows a block diagram of the inputs, outputs, and components of a controller.

FIG. 11 shows a block diagram 1100 of the inputs, outputs, and components of the controller 1002. The controller 1002 has a speed profiler 1102 which affects the operation of a throttle/brake controller 1104. For example, the speed profiler 1102 instructs the throttle/brake controller 1104 to engage acceleration or engage deceleration using the throttle/brake 1106 depending on, e.g., feedback received by the controller 1002 and processed by the speed profiler 1102.

The controller 1002 also has a lateral tracking controller 1108 which affects the operation of a steering controller 1110. For example, the lateral tracking controller 1108 instructs the steering controller 1110 to adjust the position of the steering angle actuator 1112 depending on, e.g., feedback received by the controller 1002 and processed by the lateral tracking controller 1108.

The controller 1002 receives several inputs used to determine how to control the throttle/brake 1106 and steering angle actuator 1112. A planning module 404 provides information used by the controller 1002, for example, to choose a heading when the AV 100 begins operation and to determine which road segment to traverse when the AV 100 reaches an intersection. A localization module 408 provides information to the controller 1002 describing the current location of the AV 100, for example, so that the controller 1002 can determine if the AV 100 is at a location expected based on the manner in which the throttle/brake 1106 and steering angle actuator 1112 are being controlled. In some embodiments, the localization module 408 provides information to the controller 1002 describing the current velocity, acceleration of the AV 100. In an embodiment, the controller 1002 receives information from other inputs 1114, e.g., information received from databases, computer networks, etc.

Expressive Vehicle System

Figure 12:
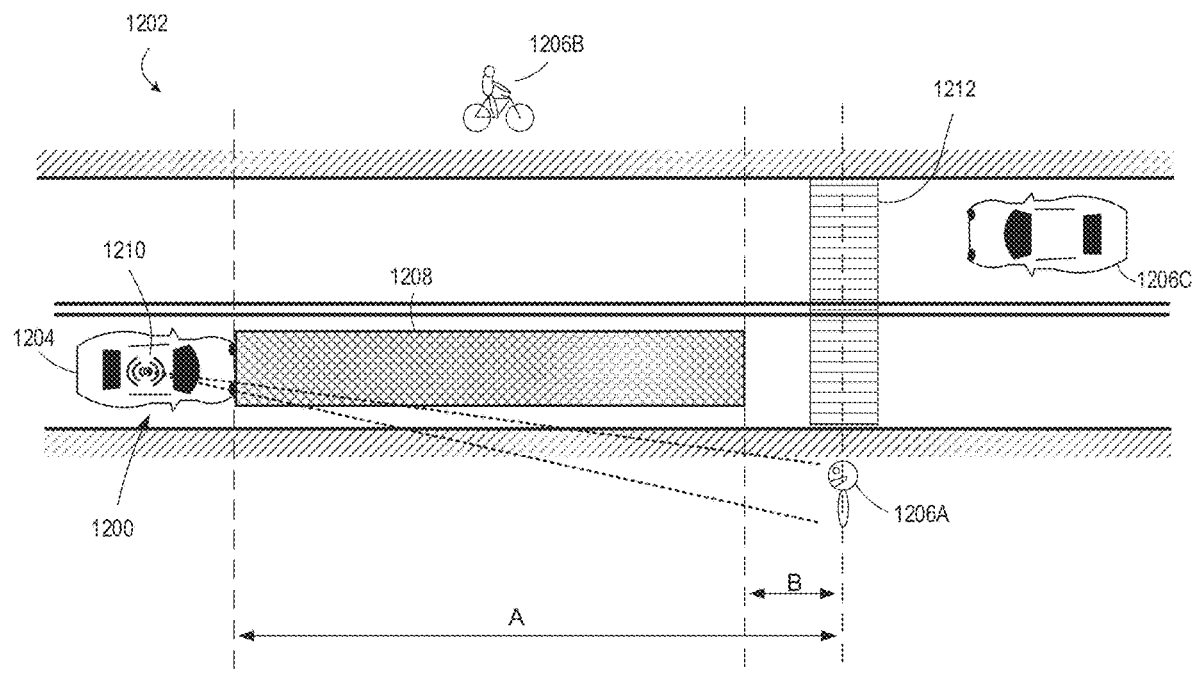
FIG. 12 shows an example scenario of an expressive vehicle system communicating intent to a pedestrian using a deceleration maneuver.

FIG. 12 is an illustration of an expressive vehicle system 1200 operating within an environment 1202 (e.g., street, intersection, parking lot). The expressive vehicle system 1200 is implemented within a vehicle 1204. In an embodiment, the vehicle 1204 is the AV 100 described with respect to FIG. 1. As used herein, the expressive vehicle system 1200 (e.g., AV system 120) is "expressive" in that it conveys an operational state of the vehicle 1204 to one or more objects in the environment 1202 (e.g., other vehicles, pedestrians, cyclists, etc.). In some embodiments, this "expressive" communication is in the form of an expressive maneuver (e.g., involving one or more control features of the vehicle such as a deceleration, an acceleration, or a steering behavior (e.g., a steering angle variation) of the vehicle 1204). In some embodiments, this "expressive" communication can include an expressive indication (e.g., involving one or more speakers, lights, or displays of the vehicle 1204). In this way, the expressive communication can include a deceleration, an acceleration, or a steering behavior without involving one or more speakers, lights, or displays of the vehicle 1204 or can include a deceleration, an acceleration, or a steering behavior in addition to involving one or more speakers, lights, or displays of the vehicle 1204.

Vehicle 1204 includes at least one sensor 1210 (e.g., sensors 121 described with reference to FIG. 1) configured to detect the objects 1206A, 1206B, 1206C (generally objects 1206) in the environment 1202 external to the vehicle 1204. In some embodiments, the at least one sensor 1210 is substantially the same as sensors 121 (e.g., LiDAR 123 and/or cameras 122) described with reference to FIG. 1.

Figure 13:
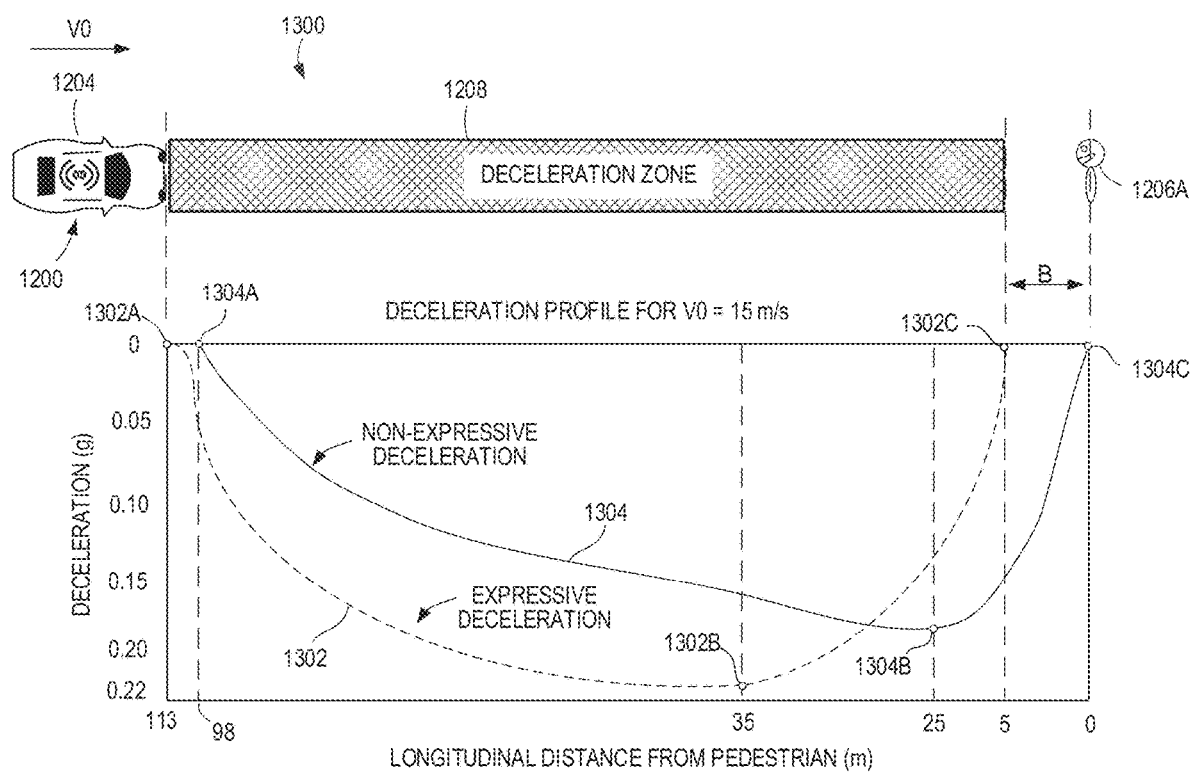
FIG. 13 illustrates a deceleration profile of an expressive vehicle system.

Additionally, as shown in FIG. 13, the at least one sensor 1210 may include monocular or stereo video cameras in the visible light, infrared or thermal (or both) spectra, RADAR, ultrasonic sensors, time-of-flight (TOF) depth sensors, speed sensors, temperature sensors, humidity sensors, and precipitation sensors.

Referring again to FIG. 12, the expressive vehicle system 1200 obtains data associated with the environment 1202. In this example, data representing the pedestrian 1206A of obtained using the at least one sensor 1210 and data representing a location of a crosswalk 1212 is obtained from a database. For example, the expressive vehicle system 1200 can communicate with an image processing system as part of a perception module that identified the at least one object as a pedestrian based on one or more images of the pedestrian 1206A and also determines a pose (or gaze) of the pedestrian 1206A based on one or more images of the pedestrian 1206A. In this example, the data also represents the pedestrian 1206A on the side of a road (e.g., not in the current lane of the vehicle 1204). The data also represents the pedestrian 1206A with a pose directed towards the vehicle 1204 and being a distance A away from the vehicle 1204 (e.g., from a front bumper of the vehicle 1204). In this example, the expressive vehicle system 1200 also determines a distance between the pedestrian 1206A and the crosswalk 1212 (e.g., one or more boundaries of crosswalk 1212).

In some embodiments, the expressive vehicle system 1200 selects at least one entry condition for initiating an expressive maneuver based on the at least one object. For example, if the expressive vehicle system 1200 identifies the at least one object as a pedestrian, the expressive vehicle system 1200 selects an entry condition to be whether the location of a pedestrian 1206A is within a first distance (e.g., 2 meters, 3 meters, etc.) from the location of the crosswalk 1212. Similarly, if the expressive vehicle system 1200 identifies the at least one object as a pedestrian, the expressive vehicle system 1200 selects an entry condition to be whether the pose of the pedestrian 1206A is directed towards the vehicle 1204 or towards the road of the vehicle 1204.

If all the entry conditions are satisfied, the vehicle 1204 performs an expressive maneuver to convey the vehicle's 1204 intent to the pedestrian 1206A. On the other hand, if some of the entry conditions are not satisfied, the vehicle 1204 does not perform an expressive maneuver to convey the vehicle's 1204 intent to the pedestrian 1206A.

For example, if the pedestrian 1206A is within 2 meters of a side of the crosswalk 1212, the expressive vehicle system 1200 determines that the pedestrian 1206A intends to cross the road via the crosswalk 1212 and therefore the vehicle 1204 performs an expressive maneuver. In other examples, if the pedestrian 1206A is within 3 meters of the crosswalk 1212 (e.g., within 3 meters from a side of the crosswalk 1212) and the pose of the pedestrian 1206A is in the direction towards the vehicle 1204, the expressive vehicle system 1200 also determines that the pedestrian 1206A intends to cross the road via the crosswalk 1212 and therefore the vehicle 1204 performs an expressive maneuver. Conversely, if the pedestrian 1206A is greater than 5 meters away from the crosswalk 1212) and the pose of the pedestrian 1206A is in a direction away the vehicle 1204, the expressive vehicle system 1200 determines that the pedestrian 1206A does not intend to cross the road via the crosswalk 1212 and therefore the vehicle 1204 does not perform an expressive maneuver. In this way, the expressive vehicle system 1200 determines whether all entry conditions for initiating an expressive maneuver are satisfied and, in response, transmits data associated with the control of the vehicle to a vehicle controller (e.g., controller 1002) for causing the vehicle to perform the expressive maneuver.

In some embodiments, the expressive vehicle system 1200 determines the expressive maneuver. In some examples, the expressive vehicle system 1200 determines the expressive maneuver based on a location of the vehicle 1204 in the environment 1202 and a location of the pedestrian 1206A in the environment 1202. For example, the expressive vehicle system 1200 can determine the expressive maneuver to include a deceleration of the vehicle 1204 such that the vehicle 1204 stops a predetermined distance B away from the pedestrian 1206A. In this example, the expressive vehicle system 1200 determines the deceleration to include a start point (e.g., a distance away from the pedestrian 1206A where the deceleration is first applied), a maximum deceleration point (e.g., a distance away from the pedestrian 1206A where the maximum deceleration is applied), and a stopping point (e.g., a distance away from the pedestrian 1206A where the vehicle 1204 reaches a complete stop). These features are described with reference to FIG. 13 below.

FIG. 13 illustrates an expressive deceleration maneuver 1300 based on the scenario represented in FIG. 12. In this example, the expressive vehicle system 1200 determines the expressive maneuver to include a deceleration profile 1302 with a starting point 1302A, a maximum deceleration point 1302B, and a stopping point 1302C. In this example, the expressive vehicle system 1200 receives data (e.g., from a localization module, such as localization module 408) indicating that the vehicle 1204 is travelling with an initial velocity V0 of 15 m/s and then determines the expressive deceleration to include a starting point 1302A of 113 meters away from the pedestrian 1206A so that there is sufficient space for the vehicle 1204 to come to a complete stop in the "deceleration zone" 1208. In general, the deceleration zone 1208 is an amount of distance required to perform the expressive deceleration maneuver and is defined by the starting point 1302A and the stopping point 1302C, which in turn, can be based on the vehicle's 1204 initial velocity V0.

In this example, the expressive vehicle system 1200 determines the stopping point 1302C to be 5 meters away from the pedestrian 1206A and determines the maximum deceleration point 1302B to be 35 meters away from the pedestrian 1206A. In this example, the maximum deceleration magnitude is about 0.22 g. Here "g" is the gravitational force constant (g) approximated as 9.81 m/s$^2$. The actual deceleration magnitude will depend on the mass of the vehicle 1204 in accordance with Newton's laws of motion. In some examples, the maximum deceleration will be at least 0.15 g. In some examples, the vehicle 1504 will decelerate with a higher maximum deceleration (e.g., 0.3, 0.5 g, 1 g) so that the pedestrian 1206A has a higher confidence that the vehicle 1204 is aware of the pedestrian 1206A.

Importantly, when the vehicle 1204 performs the expressive deceleration profile 1302, all these features (the starting point 1302A, the maximum deceleration point 1302B, and the stopping point 1302C) help communicate intent to the pedestrian 1206A.

For example, when the vehicle 1204 comes to a complete stop at least 5 meters away from the pedestrian 1206A, the pedestrian 1206A is more confident that the vehicle 1204 is stopping to allow the pedestrian 1206A to cross the road via the crosswalk 1212 (as shown in FIG. 12). On the other hand, a non-expressive deceleration profile 1304 includes a stopping point 1304C that is at the location of the pedestrian 1206A (e.g., less than 2 meters away from the pedestrian 1206A). When the vehicle 1204 comes to a complete stop at the location of the pedestrian 1206A, the pedestrian 1206A is less confident that the vehicle 1204 is stopping to allow the pedestrian 1206A to cross the road via the crosswalk 1212. In the example shown, the stopping point 1502C is 5 meters before the stopping point 1504C. In some examples, the stopping point 1502C is 5 meters before the stopping point 1504C regardless of the velocity of the vehicle 1204.

As another example, when the vehicle 1204 begins to initiate the deceleration at the starting point 1302A of 113 meters away from the pedestrian 1206A (which in this example represents about 7.5 seconds away from the pedestrian 1206A), the pedestrian 1206A is more confident that the vehicle 1204 is stopping to allow the pedestrian 1206A to cross the road. On the other hand, a non-expressive deceleration profile 1304 includes a starting point 1304A that is 98 meters away from the pedestrian 1206A (which in this example represents about 6.5 seconds away from the pedestrian 1206A). The longer the vehicle 1204 waits to begin to initiate the deceleration, the lower the confidence of the pedestrian 1206A. In the example shown, the starting point 1502A is 15 meters before the starting point 1504A.

As another example, when the vehicle 1204 reaches a maximum deceleration point at the maximum deceleration point 1302B of 35 meters away from the pedestrian 1206A, the pedestrian 1206A is more confident that the vehicle 1204 is stopping to allow the pedestrian 1206A to cross the road. On the other hand, the non-expressive deceleration profile 1304 includes a maximum deceleration point 1304B that is 25 meters away from the pedestrian 1206A. The closer to the pedestrian 1206A the vehicle 1204 is at the maximum deceleration point, the lower the confidence of the pedestrian 1206A. In the example shown, the maximum deceleration point 1302B is 10 meters before maximum deceleration point 1504B. In some examples, the maximum deceleration point 1502B is 10 meters before the maximum deceleration point 1504B regardless of the velocity of the vehicle 1204.

As described herein, a "non-expressive deceleration" or "non-expressive maneuver" refers to a vehicle that either does not have an expressive maneuver capability or a vehicle that does have an expressive maneuver capability but the expressive maneuver is disabled (e.g., a planning module (e.g., planning module 404) can determine that the vehicle 1204 should forgo performing the expressive maneuver in certain situations). For example, vehicle 1204 can select to not perform an expressive maneuver if some of the entry conditions are not satisfied (as described above with reference to FIG. 12). In some examples, a "non-expressive deceleration" or "non-expressive maneuver" can represent behavior of a human driver. In this way, the expressive vehicle system 1200 can cause the vehicle 1204 to perform an expressive deceleration that begins to stop one second sooner than a human driver, reaches a peak deceleration 10 meters further away from the pedestrian 1206A than a human driver, and comes to a complete stop further away from the pedestrian 1206A than a human driver. Additionally, a "non-expressive deceleration" or "non-expressive maneuver" can represent a deceleration profile of the vehicle 1204 when no object is detected (e.g., no pedestrians 1206A are present).

In some embodiments, the expressive vehicle system 1200 determines the deceleration profile 1302 based on the initial velocity V0 of the vehicle 1204. For example, the starting point can be further away from the pedestrian 1206A if the vehicle 1204 is travelling at a faster velocity so there is sufficient space to come to a complete stop at least 5 meters away from the pedestrian 1206A. This dependency is described below with reference to Table 1.

In some embodiments, the expressive vehicle system 1200 determines the deceleration based on a velocity of the at least one object relative to the velocity of the vehicle. For example, if the expressive vehicle system 1200 determines that the at least one object is approaching the vehicle quickly (e.g., the object representing a pedestrian that is running or an individual riding a bicycle toward the vehicle) then the expressive vehicle system 1200 may define rate of deceleration representing an immediate deceleration of the vehicle (e.g., abrupt stop). In this scenario, deceleration may represent a movement where the vehicle 1204 comes to a complete stop well before an intersection where the pedestrian, bicyclist, and/or the like (e.g., >50 feet) is expected to enter the path of the vehicle. In some examples, the expressive vehicle system 1200 determines the intersection based on an intersection point of trajectories of the vehicle and the at least one object (e.g., as described with reference to the jaywalker scenario of FIG. 18 below).

Table 1 below represents seven different initial velocity scenarios (S1-S7) for the example described with reference to FIGS. 12 and 13 above. As with the description above, distance values in Table 1 represent the distance between the vehicle 1204 and the pedestrian 1206A.

is manually controlled by a driver, or when the expressive vehicle system 1200 is disabled in the A/V stack), the vehicle 1204 might initiate the deceleration 6.5 seconds prior to reaching the pedestrian 1206A. At an initial velocity V0 of 5 m/s, this means that a typical driver will initiate a stop when the vehicle 1204 is about 33 meters from the pedestrian 1206A to ensure there is sufficient space for the vehicle 1204 to reach a stop.

On the other hand, when the expressive vehicle system 1200 is enabled, the expressive vehicle system 1200 determines to initiate a deceleration 7.5 seconds prior to reaching the pedestrian 1206A (e.g., 1 second sooner than when the expressive vehicle system 1200 is disabled). At an initial vehicle velocity V0 of 5 m/s, this means that the expressive vehicle system 1200 will cause the vehicle 1204 to initiate a stop when the vehicle 1204 is about 38 meters from the pedestrian 1206*a* to ensure that there is sufficient space for the vehicle 1204 to perform the expressive vehicle behavior and come to a complete stop at least 5 meters away from the pedestrian 1206A. In this example, the expressive vehicle behavior represents initiating a stop 1 second before a non-expressive vehicle would and 5 meters further from the pedestrian 1206*a* than the non-expressive vehicle would.

In some embodiments, the expressive vehicle system 1200 includes an entry condition based on whether or not the

TABLE 1

Expressive deceleration scenarios.

| Parameter | Unit | Description | S1 | S2 | S3 | S4 | S5 | S6 | S7 |
|---|---|---|---|---|---|---|---|---|---|
| Initial Speed | m/s | Initial speed of the automated vehicle prior to braking. | 5 | 10 | 15 | 20 | 25 | 30 | 35 |
| Initial Speed | mph | Convert to mph. | 11 | 22 | 33 | 44 | 56 | 67 | 78 |
| Typical Human Braking Start Point | TTC (s) | Point at which braking is initiated. TTC is time to contact with the stop line. In other words, at the vehicle's initial speed, how long it will take in seconds to contact the stop line. | 6.5 | 6.5 | 6.5 | 6.5 | 6.5 | 6.5 | 6.5 |
| Typical Human Braking Start Point | m | Converted from time to distance. | 33 | 65 | 98 | 130 | 163 | 195 | 228 |
| Expressive Braking Start Point | TTC (s) | Point at which braking is initiated. | 7.5 | 7.5 | 7.5 | 7.5 | 7.5 | 7.5 | 7.5 |
| Expressive Braking Start Point | m | Converted from time to distance. | 38 | 75 | 113 | 150 | 188 | 225 | 263 |
| Expressive Delta Distance | m | Difference between typical human braking start point and expressive braking start point. | 5 | 10 | 15 | 20 | 25 | 30 | 35 |
| Typical Human Max Deceleration Distance | m | Point at which human drivers typically reach max deceleration during a braking event. |  | 25 | 25 | 25 | 25 | 25 | 25 |
| Expressive Max Deceleration Distance | m | Point at which an expressive max deceleration point is reached. |  | 35 | 35 | 35 | 35 | 35 | 35 |
| Expressive Delta Distance | m | Difference between typical max deceleration |  | 10 | 10 | 10 | 10 | 10 | 10 |
| Typical Human Stop Location | m | Point at which humans stop relative to stop line. | 0 | 0 | 0 | 0 | 0 | 0 | 0 |
| Expressive Stop Location | m | Expressive stop location relative to stop line. | 5 | 5 | 5 | 5 | 5 | 5 | 5 |
| Expressive Delta Distance | m | Difference between human stop location and expressive stop location | 5 | 5 | 5 | 5 | 5 | 5 | 5 |

Scenario S1 represents the vehicle 1204 traveling at a velocity V0 5 m/s (11 mph) prior to initiating a deceleration. In this example, when the vehicle 1204 is not using the expressive vehicle system 1200 (e.g., when the vehicle 1204 vehicle must stop short (e.g., greater than 1 g deceleration) to perform a particular maneuver. For example, if the vehicle determines that the vehicle 1204 must stop short, the vehicle 1204 may determine to not perform the maneuver and instead may communicate intention using an alternate approach (e.g., by transmitting sounds instead of performing a maneuver).

In some embodiments, the expressive vehicle system 1200 includes an entry condition based on the initial velocity V0 of the vehicle 1204. For example, if the expressive vehicle system 1200 receives data that the vehicle 1204 is travelling with a velocity V0 of 5 m/s or less, the expressive vehicle system 1200 can determine to not perform the expressive maneuver. In this example, the vehicle is travelling with a velocity V0 of 5 m/s and the expressive vehicle system 1200 determines to not use the expressive maneuver and instead use a deceleration profile similar to the non-expressive deceleration profile 1304. For example, there is very little difference between an expressive maneuver and a non-expressive maneuver when the vehicle is traveling slowly (e.g., less than 5 m/s) that the pedestrian 1206A is unlikely to notice. For this reason, several rows of scenario S1 are empty to reflect the fact that an expressive maneuver is not performed.

Scenario S2 represents a similar scenario of scenario S1, except that the vehicle 1204 is traveling at 10 m/s prior to initiating a deceleration. In this example, the expressive vehicle system 1200 determines to initiate a stop about 7.5 seconds prior to reaching the pedestrian 1206a (e.g., 1 second sooner than if the expressive vehicle system 1200 were disabled). At an initial velocity V0 of 10 m/s, this means that the expressive vehicle system 1200 will cause the vehicle 1204 to initiate a deceleration when the vehicle 1204 is about 75 meters from the pedestrian 1206A to ensure that there is sufficient space for the vehicle 1204 to perform expressive vehicle behavior in the deceleration zone 1208.

In scenario S2, the difference between a typical human braking start point and expressive braking start point is 10 meters (75 meters compared to 65 meters). Typically, a non-expressive maneuver would include a deceleration profile with a max deceleration point at a distance of 25 meters from the pedestrian 1206A. On the other hand, when the expressive vehicle system 1200 is enabled, the expressive vehicle system 1200 defines a deceleration profile with a max deceleration point at a distance of 35 meters from the pedestrian 1206A. In this scenario, the peak deceleration point is 10 meters further away from the pedestrian 1206A when the expressive vehicle system 1200 is enabled compared to when a non-expressive maneuver is performed.

Furthermore, in scenario S2, a non-expressive maneuver may cause the vehicle 1204 to stop directly at the location of the pedestrian 1206A. On the other hand, the expressive vehicle system 1200 defines a deceleration profile with a stopping point at a distance of 5 meters from the pedestrian 1206A.

Scenarios S3-S7 are similar to scenarios S1 and S2 but represent different initial velocities V0 of the vehicle 1204. Scenario S3 represents an initial velocity V0 of 15 m/s, scenario S4 represents an initial velocity V0 of 20 m/s, scenario S5 represents an initial velocity V0 of 25 m/s, scenario S6 represents an initial velocity V0 of 30 m/s, and scenario S7 represents an initial velocity V0 of 35 m/s. Additionally, scenario S4 is represented by the deceleration profile 1302 shown in FIG. 13 above.

The scenarios of Table 1 illustrate that the expressive vehicle system 1200 determines a deceleration profile based on the initial velocity V0 of the vehicle 1204. In particular, these scenarios illustrate that, when the expressive vehicle system 1200 is enabled, the vehicle 1204 initiates a stop at a distance further from the pedestrian 1206A compared to the vehicle 1204 with the expressive vehicle system 1200 disabled. Additionally, the distance of the maximum deceleration point from the pedestrian 1206A can be the same regardless of the initial velocity V0 of the vehicle and the distance of the stopping point from the pedestrian 1206A can be the same regardless of the initial velocity V0 of the vehicle 1204. For example, the expressive vehicle system 1200 can determine the maximum deceleration point to be at least 30 meters away from the pedestrian 1206A regardless of the initial velocity V0 of the vehicle 1204. In another example, the expressive vehicle system 1200 can determine the stopping point to be at least 2 meters away from the pedestrian 1206A.

In some embodiments, the expressive vehicle system 1200 generates data associated with the control of the vehicle 1204 based on the deceleration associated with the expressive maneuver and transmits the data associated with the control of the vehicle 1204 to cause the vehicle 1204 to decelerate based on the deceleration associated with the expressive maneuver. For example, the data can represent control signals that are transmitted to control hardware (e.g., a throttle/brake controller [e.g., the throttle/brake controller 1104], a steering wheel controller [e.g. the steering wheel controller 1110], etc.) as described in FIG. 14 below.

In some embodiments, the expressive vehicle system 1200 includes an exit (or time-out) feature that "waits" for the pedestrian 1206A to cross the road after the vehicle 1204 stops to allow the pedestrian 1206A to cross the road. In some cases, the exit feature is helpful in scenarios with blind pedestrians who cannot "see" that the vehicle 1204 is waiting for the pedestrian to cross the road. In some examples, the time-out feature is a timer (sometimes referred to as a "watchdog timer") that gives the pedestrian 1206A a predetermined amount of time to begin moving to cross the road (e.g., 20 seconds, 30 seconds, etc.) before the vehicle 1204 takes a subsequent action (e.g., drives off, honks horn, etc.) For example, if the vehicle 1204 stops and the pedestrian 1206A has not moved within the predetermined amount of time, then the vehicle 1204 might determine that something is wrong and the vehicle 1204 will instead take a subsequent action (e.g., accelerate and drive off). In some examples, the expressive vehicle system 1200 obtains data about the pedestrian 1206A periodically (e.g., every second, every 2 seconds, etc.) or continuously using the at least one sensor 1210 of the vehicle 1204 to monitor the location of the pedestrian 1206A after the vehicle 1204 has stopped.

On the other hand, if the vehicle 1204 stops and after the predetermined amount of time, the pedestrian 1206A is on the other side of the road (e.g., opposite the initial location of the pedestrian 1206A), the expressive vehicle system 1200 determines that the pedestrian 1206A has crossed the road and the expressive vehicle system 1200 transmits data associated with the control of the vehicle 1204 to cause the vehicle 1204 to accelerate and resume the planned path of the vehicle 1204 (e.g., the planned path as determined by the planner (e.g., similar to, or the same as, planner 404) of the vehicle 1204).

On the other hand, if the vehicle 1204 stops and after the predetermined amount of time, the pedestrian 1206A is somewhere in the road (e.g., mid-way to crossing), the expressive vehicle system 1200 determines that the pedestrian 1206A is currently crossing the road and allocates additional time (e.g., one minute, etc) to wait for the pedestrian 1206A to cross the road. In some examples, this additional time is predetermined. In some examples, if the vehicle 1204 waits the additional time and the pedestrian 1206A has still not finished crossing the road, the vehicle 1204 performs a further action. For example, the vehicle

1204 may honk the horn, slowly navigate around the pedestrian 1206A, wait additional time, and/or request human assistance (e.g., from a passenger within the vehicle 1204 or remote assistance from a human overseer).

Figure 14:
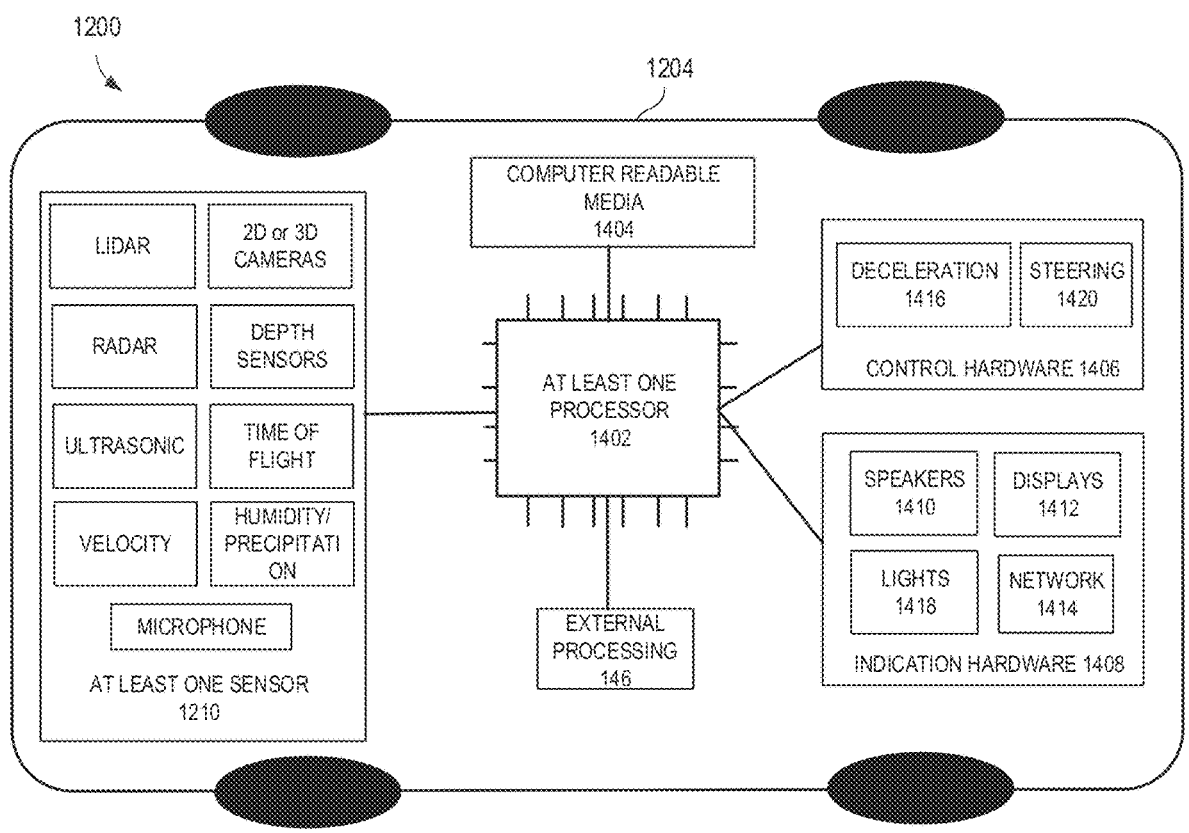
FIG. 14 shows a block diagram of an expressive vehicle system.

FIG. 14 shows mechanical and electrical aspects of the expressive vehicle system 1200 of vehicle 1204. Generally, reference numbers begin with digits that identify the particular figure on which the referenced item can initially be found. For example, at least one sensor 1210 is illustrated in FIG. 12. However, the at least one sensor is also illustrated in FIG. 14. The one or more sensors 1210 can include LiDAR sensors, radar sensors, 2D or 3D stereoscopic imaging sensors, depth sensors, ultrasonic sensors, time of flight sensors, velocity sensors, humidity sensors, precipitation sensors, microphones, etc.

Vehicle 1204 includes at least one processor 1402 (e.g., on-board, or remote) communicatively coupled to the at least sensor 1210 and configured to execute the computer executable instructions. In some embodiments, the at least one processor 1402 is the computing processor 146 of the AV system 120 described with reference to FIG. 1. In some embodiments, the at least one processor 1402 is configured to communicate with the computer processors 146 of the AV system 120. Vehicle 1204 also includes computer-readable media 1404 (e.g., memory or hard drives onboard or remote) storing computer-executable instructions. In some embodiments, the computer hardware is the same, or substantially the same, as the computer hardware of the AV system 120 described with reference to FIG. 3.

The expressive vehicle system 1200 includes control hardware 1406 that are used to control a movement of the vehicle 1204. As noted above, the control hardware 1406 can include the same, or similar, hardware of controller 1002 described with reference to FIG. 11. In some embodiments, particular control hardware 1406 includes deceleration hardware 1416 (e.g., brakes, regenerative braking systems, etc.) and/or steering hardware 1416 (e.g., steering wheels, steering systems, etc.). In some examples, the deceleration hardware 1416 is the same as, or similar to, the throttle/brake controller 1104. In some examples, the steering hardware 1416 can be the same as, or similar to, the steering wheel controller 1110. In some examples, the deceleration hardware 1416 includes a throttle (e.g., like the throttle 402B shown in FIG. 4) to control the velocity of the vehicle 1204.

The expressive vehicle system 1200 also includes indication hardware 1408 to present an indication to the pedestrians, other vehicles, etc. within the environment of the vehicle 1204. In some embodiments, the indication hardware includes one or more speakers 1410, one or more displays 1412, one or more lights 1418, and network (or communication) hardware 1414 (e.g., cellular, 3G/4G/5G, Bluetooth, Wi-Fi, etc.).

Figure 15:
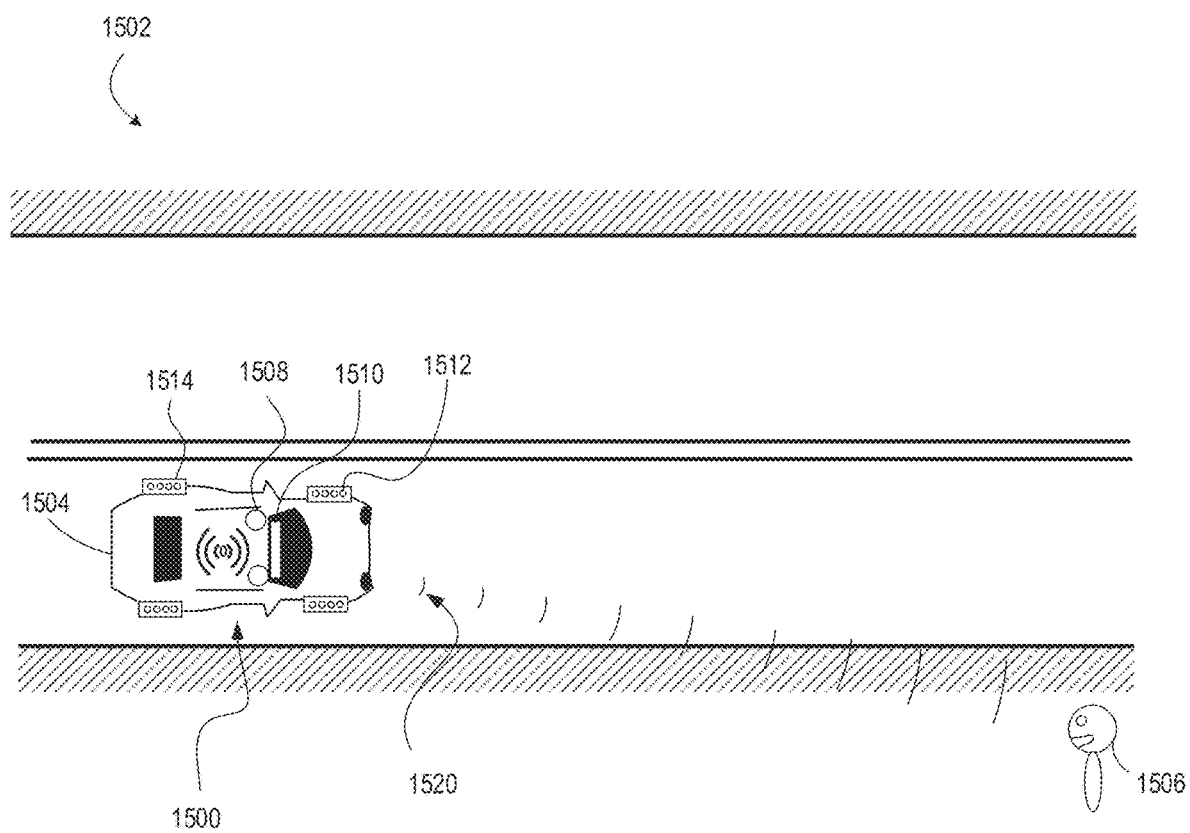
FIG. 15 shows an example scenario of an expressive vehicle system communicating intent to a pedestrian using audio and visual communication.

FIG. 15 is an illustration of a vehicle 1504 with an expressive vehicle system 1500 operating within an environment 1502 (e.g., street, intersection, parking lot). In some embodiments, the expressive vehicle system 1500 is the same as, or similar to, the expressive vehicle system 1200 described above. In this example, the expressive vehicle system 1500 presents sounds and lights to communicate intent to a pedestrian 1506. In some examples, communicating intent using light and sounds is performed in addition to the expressive maneuvers described herein. For example, the expressive vehicle system 1200 can present lights and sounds while decelerating in accordance with the deceleration profile 1302 described above with reference to FIGS. 12 and 13. In other examples, communicating intent using light and sounds is performed instead of the expressive maneuvers described herein.

In some embodiments, the expressive vehicle system 1500 determines an expressive direction toward the at least one object based on the obtained data. In some examples, the expressive vehicle system 1500 determines a distance to the detected object based on the obtained data. In some examples, the received object data indicates a relative position to the detected object (e.g., relative position of the object to the vehicle). In some examples, the expressive vehicle system 1500 determines the expressive direction based on the location of the at least one object relative to the vehicle 1504. For example, the expressive vehicle system 1450 may determine that the pedestrian is 3 meters in front of the vehicle 1504 and that the pedestrian is on the right-hand side of the vehicle 1504. In some examples, the relative location is received from a planning module (e.g., planning module 404 described with reference to FIG. 4).

In this example, the vehicle 1504 includes two speakers 1508, a display 1510, and a plurality of lights 1512 arranged on each of the four wheels 1514 of the vehicle 1504 (the lights 1512 are described in more detail with reference to FIG. 16 below). In some embodiments, the speakers 1508 are mounted on the vehicle 1504 such that the speakers 1508 can broadcast sound into the environment 1502. In some examples, the speakers 1508 are waterproof, water resistant, dust proof, or suitable for outside applications (e.g., in accordance with MIL-STD-810 standards).

In some embodiments, the expressive vehicle system 1500 broadcasts an audible indication (e.g., in the form of sound waves 1520) toward the pedestrian 1506 using the speakers 1508. In some examples, the expressive vehicle system 1500 broadcasts an audible indication with varying amplitudes (e.g., power, volume, etc.) and varying frequency content (e.g., a frequency variation between 100 Hz and 15 kHz). For example, the expressive vehicle system 1500 can broadcast sound with a frequency tone or pitch that varies in proportion to the instantaneous velocity of the vehicle 1504. For example, by proportionally associating the frequency of the transmitted sound to the vehicle velocity, it may be perceived by the pedestrian 1506 as a rate of deceleration of the vehicle 1504. For example, a vehicle stopping very quickly (e.g., over a short distance such as 30 miles per hour to zero in 20 feet) may transmit a sound that drops in frequency quickly whereas a vehicle stopping slowly (e.g., over a long distance such as 30 miles per hour to zero in 100 feet) may transmit a sound that drops in frequency more slowly. Time in this context will depend on the amount of time it takes to stop the vehicle. In this way, when the vehicle 1504 is decelerating, the sound will mimic a vehicle with a combustion engine that is slowing down. This sound is then perceived by the pedestrian 1506 as a decreasing pitch sound. This can increase the confidence of the pedestrian 1506 that the vehicle 1504 is slowing down and stopping for the pedestrian 1506. In some examples, the sound is at least one of a reducing-engine-RPM sound, an increasing-engine-RPM sound, a braking sound (e.g., brake squeal), and a rotating tire sound (e.g., sounds of tires rotating on a road surface).

In some examples, the expressive vehicle system 1500 controls the speakers 1508 to begin broadcasting an audible indication when the vehicle is greater than a first distance (e.g., 30 meters, 40 meters, and/or the like) away from the pedestrian 1506 and terminate broadcasting the audible indication when the vehicle is a second distance (e.g., 5 meters, 10 meters, and/or the like) away from the pedestrian

1506. In some examples, the transmitted sound includes frequency content greater than 5 kHz. For example, frequencies above 5 kHz may be used to represent a high-pitch brake squeal giving the pedestrian 1506 an indication that the vehicle 1504 is stopping and that it is safe for the pedestrian 1506 to move into the lane (or path) of the vehicle 1504.

In some embodiments, the expressive vehicle system 1500 periodically broadcasts an audible indication toward the pedestrian 1506. For example, the expressive vehicle system 1500 can control the speakers 1508 to pulsing one or more sounds in the direction toward the pedestrian 1506. In some examples, the expressive vehicle system 1500 periodically transmits sound every 0.1 seconds. In some examples, a high frequency (e.g., greater than 5 kHz) sound is used to indicate a warning to the pedestrian 1506 that the vehicle 1504 may not be able to safely stop in time. In other examples, the expressive vehicle system 1500 periodically transmits a low frequency (e.g., less than 5 kHz) sound to indicate to the pedestrian 1506 that the vehicle 1504 is performing a safe stopping movement and that it is safe for the pedestrian 1506 to move into the lane (or path) of the vehicle.

In some embodiments, the expressive vehicle system 1500 controls the speakers 1508 using a beam-steering technique (e.g., beamforming) to "steer" the sound waves 1520 about an azimuth of the vehicle 1504 such that a majority of the energy of the sound waves 1520 are in the direction toward the pedestrian 1506. For example, the expressive vehicle system 1450 can transmit the audible indication from at least two speakers 1508 so the transmitted acoustic waves interact and propagate in the direction of the pedestrian 1506. For example, in the illustration of FIG. 15, the two speakers 1508 are aligned such that the transmitted sound is steered toward the right-hand side of the vehicle 1504 towards the pedestrian 1506.

In some embodiments, the expressive vehicle system 1500 obtains data representing an ambient sound level of the environment 1502 (e.g., from one or more microphones of the vehicle 1504) and controls the speakers 1508 to broadcast an audible indication that is louder than the ambient sound level of the environment 1502. In some examples, the audible indication is at least 5 dBA louder than the ambient noise level. In this way, the transmitted sound "cuts" through the ambient background noise to draw attention to the vehicle 1504 and/or the message conveyed in the transmitted sound.

In some embodiments, the expressive vehicle system 1500 transmits an audible indication that includes an audible message. In some examples, the audible message includes spoken words. In some examples, the expressive vehicle system 1500 transmits an audible indication that announces "SAFE TO CROSS" or "STAY BACK." In some examples, the expressive vehicle system 1500 determines a language of the audible message based on a geographic area of the vehicle 1504 (e.g., as determined via GPS data). For example, English is used in the US, Chinese is used in China, Malay is used in Singapore, etc.

In some embodiments, the expressive vehicle system 1500 broadcasts a visual indication (e.g., in the form of light) using one or more displays 1510 of the vehicle 1504. In the example shown in FIG. 15, the display 1510 is arranged on the windshield of the vehicle 1504 generally near where a human driver would be sitting. In this way, when the pedestrian 1506 looks toward the vehicle 1504 (generally as would be done if the pedestrian 1506 were trying to communicate with the driver), the pedestrian 1506 would have an increased chance of seeing the display 1510 (e.g., compared to arranging the display on the front bumper of the vehicle 1504). However, this is by no means limiting. The display 1510 can be placed anywhere on the exterior of the vehicle to convey intent to the pedestrian 1506.

In some embodiments, the expressive vehicle system 1450 presents a visual indication that includes displaying an image using the display 1510. In some examples, the display 1510 is configured to display an image that indicates to the pedestrian 1506 that the vehicle 1504 is aware of the pedestrian 1506 and that it is safe for the pedestrian 1506 to move into the path of the vehicle 1504. In this scenario, the displayed image may be similar to a crosswalk sign. For example, a "safe-to-walk" crosswalk image indicates when it is safe to move into the path of the vehicle 1504, while a "don't walk" image indicates when it is not safe to walk into the path of the vehicle 1504.

In some embodiments, the expressive vehicle system 1500 obtains data representing an ambient brightness level of the environment 1502 (e.g., from one or more brightness sensors of the vehicle 1504) and controls the display 1510 to be illuminated brighter than the ambient brightness of the environment 1502 for increased visibility of the visual indication.

In some embodiments, the expressive vehicle system 1500 presents the visual indication using one or more lights 1512 of the vehicle 1504. In the embodiment shown, the vehicle 1504 includes four wheels 1514 and each wheel 1514 includes a plurality of lights 1512. This is further described with reference to FIG. 16 below.

Figure 16:
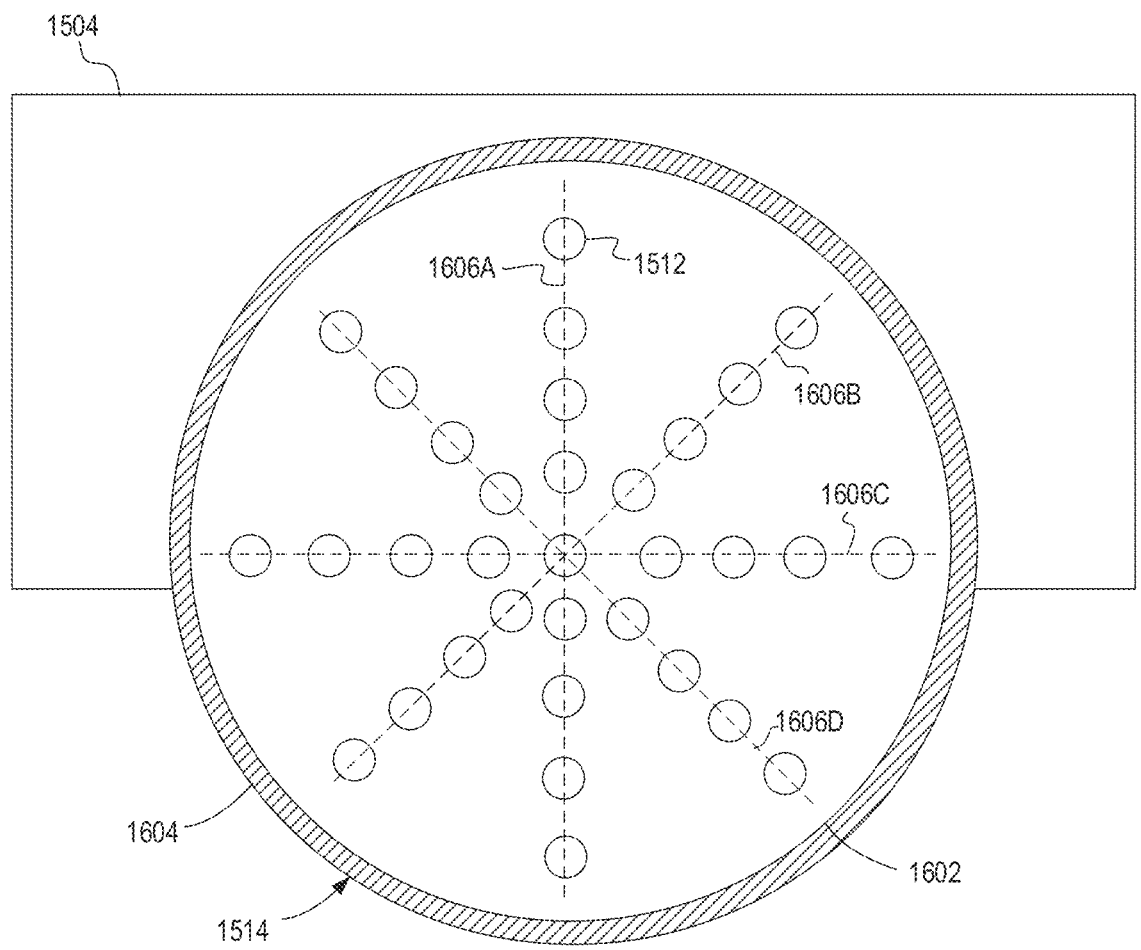
FIG. 16 shows a schematic of a wheel of a vehicle with expressive lighting.

FIG. 16 shows a schematic view of one of the wheels 1514 of the vehicle 1504. The wheel 1514 includes a structural rim portion 1602 and a soft tire portion 1604. The structural rim portion 1602 includes the plurality of lights 1512 arranged on the wheel 1514 of the vehicle 1504. The plurality of lights 1512 are arranged in straight lines or "spokes" 1606A-D (generally spokes 1606) that resemble spokes of a bicycle wheel. In some examples, each light 1512 is an LED with a color spectrum that includes white, red, yellow, green, blue and/or cyan.

In some embodiments, the expressive vehicle system 1500 independently controls each light 1512 and/or independently controls each spoke 1606 to communicate intent to the pedestrian 1506. For example, the expressive vehicle system 1500 can control each light 1512 associated with each spoke 1606 to communicate an indication of vehicle motion to the pedestrian 1506. For example, the expressive vehicle system 1500 can control each light 1512 associated with a first spoke 1606 (e.g., spoke 1606A) to illuminate with the other spokes 1606 (e.g., spokes 1606B-D) unilluminated. Then the expressive vehicle system 1500 can control each light 1512 associated with a second spoke 1606 (e.g., spoke 1606B) to illuminate with the other spokes 1606 (e.g., spokes 1606A, C-D) unilluminated. The expressive vehicle system 1500 then continues this process until each spoke 1606 has been illuminated and then cyclically repeats the process. This illumination gives the impression of motion to an observer.

In some embodiments, the expressive vehicle system 1500 independently controls each spoke 1606 such that the spokes 1606 give the impression that the wheel 1514 is spinning with a certain velocity. For example, the expressive vehicle system 1500 can control an illumination of each light 1512 of each spoke 1606 to present an impression that the vehicle 1504 is travelling a constant velocity (e.g., 15 m/s) even if the vehicle 1504 is not travelling at this constant velocity. In some examples, the expressive vehicle system 1500 can control an illumination of each light 1512 of each spoke 1606 to present an impression that the vehicle 1504 is decelerating. In some examples, this implied velocity is less than the actual velocity of the vehicle 1504. This can be helpful in scenarios where the vehicle 1504 is stopping to allow the pedestrian 1506 to cross the road and the pedestrian 1506 will see that the lights 1512 of the wheels are spinning slower than the velocity of the vehicle 1504 would otherwise represent. In some examples, the expressive vehicle system 1500 can control an illumination of each light 1512 of each spoke 1606 to present an impression that the vehicle 1504 is stopped or is travelling a backwards even if the vehicle 1504 is travelling forward.

In some embodiments, the structural rim portion 1602 of the wheel 1514 includes one or more circular LED displays (e.g., monitor displays). In some examples, the expressive vehicle system 1500 independently controls the one or more circular LED displays to animate acceleration and decelerating wheel motions.

In some embodiments, the vehicle 1504 includes one or more lights in the wheel well of each wheel. In some examples, the expressive vehicle system 1500 independently controls the one or more wheel well lights to illuminate the wheels and/or rims. For example, the expressive vehicle system 1500 can control all the wheel well lights to turn on to illuminate all the wheels and rims of the vehicle 1504 to draw the pedestrian's 1506 attention to the wheels/rims. In some examples, the expressive vehicle system 1500 controls all the wheel well lights to turn on to illuminate all the wheels and rims of the vehicle 1504 when the vehicle 1504 is about to accelerate from a stopped position or when the vehicle 1504 is about to speed up while already in motion. In some examples, the expressive vehicle system 1500 controls all the wheel well lights to turn off (or dim) to decrease the illumination of all the wheels and rims of the vehicle 1504 when the vehicle 1504 is about to decelerate and/or stop. In this way, the expressive vehicle system 1500 can control one or more wheel well lights to control an illumination of the wheels of the vehicle 1504 based on whether the vehicle 1504 is about to accelerate or decelerate.

Referring back to FIG. 15, the vehicle 1504 can also include lights in locations other than the wheels 1514. In some examples, one or more lights are arranged on the dash of the vehicle 1504, on the bumpers of the vehicle 1504, around the typical driver position of the vehicle 1504, around the wheel 1514 of the vehicle 1504, etc. In some examples, the lights are an LED strip light on an exterior of the vehicle 1504.

In some embodiments, the expressive vehicle system 1500 determines that a visual indication is observable from a location of the pedestrian 1506 based on a clearance around the vehicle 1504. For example, if the expressive vehicle system 1500 determines that a clearance around the vehicle 1504 exists (e.g., another vehicle is not blocking a line of sight path between the pedestrian 1506 and the vehicle 1504), the expressive vehicle system 1500 illuminates the visual indication.

In an embodiment, the expressive vehicle system 1500 determines whether to present the expressive indication (e.g., visual and/or audible) based on a distance of the vehicle 1504 to the pedestrian 1506. For example, if the expressive vehicle system 1500 determines that the pedestrian 1506 is too far from the vehicle 1504 (e.g., greater than 100 meters), the expressive vehicle system 1500 may determine to not present the expressive indication until the vehicle 1504 is closer to the pedestrian 1506 (e.g., within 50 meters) to increase the likelihood that the pedestrian 1506 will see (and/or hear) the indication. Once the expressive vehicle system 1500 obtains data that the pedestrian 1506 is within a predetermined distance from the vehicle 1504 (e.g., within 50 meters, within 20 meters, etc.), the expressive vehicle system 1500 presents the expressive indication in a direction towards the pedestrian 1506.

Figure 17:
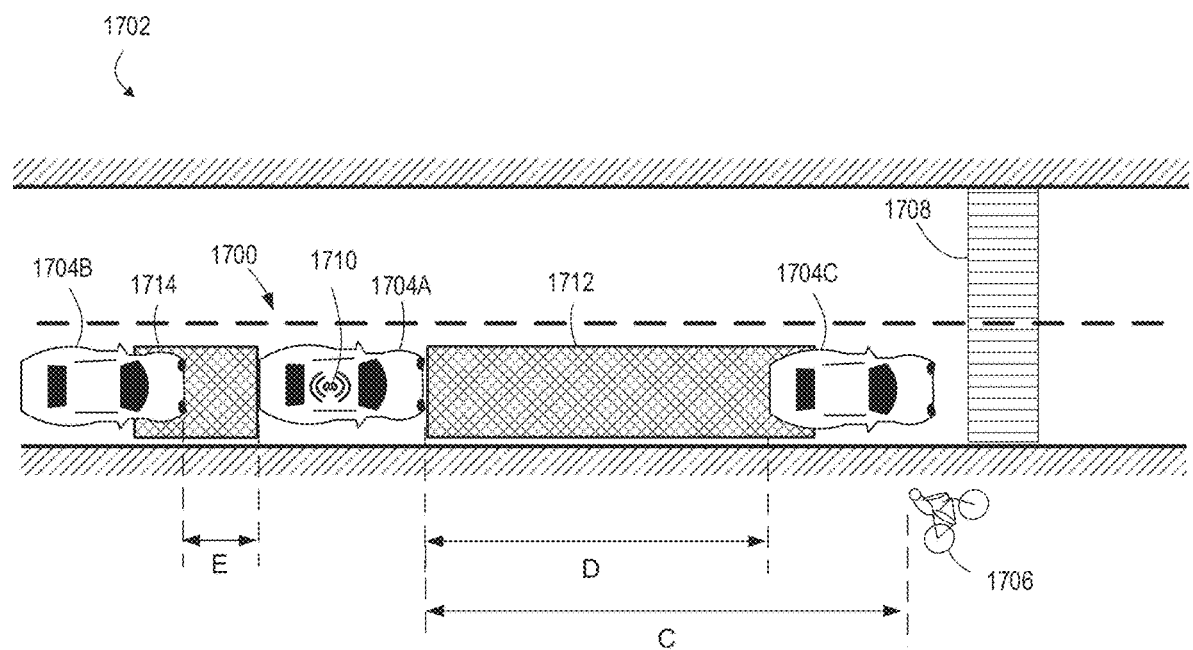
FIG. 17 shows an example scenario of an expressive vehicle system communicating intent to a cyclist approaching a crosswalk in the path of the vehicle.

FIG. 17 shows an example scenario of an expressive vehicle system 1700 of a vehicle 1704A communicating intent to cyclist 1706 approaching a crosswalk 1708 in the path of the vehicle 1704A within an environment 1702. In this scenario, the expressive vehicle system 1700 includes the functionality of the expressive vehicle systems described above (e.g., expressive vehicle system 1200 and 1500). However, any of the expressive vehicle systems described herein are able to perform the functions of this scenario.

The scenario shown in FIG. 17 is different from the scenario of FIG. 12 in the following ways. The scenario of FIG. 17 includes multiple vehicles 1704B-C in the same lane as the vehicle 1704A with the expressive vehicle system 1700. The scenario of FIG. 16 did not include any other vehicles in the same lane as the vehicle 1204 with the expressive vehicle system 1200. In particular, the scenario of FIG. 17 highlights a situation that can occur when a vehicle 1704C is in front of the vehicle 1704A with the expressive vehicle system 1700. In addition, the scenario of FIG. 17 highlights a situation where the at least one object is a cyclist 1706 who may be moving faster than a pedestrian and the expressive vehicle system 1700 can determine the expressive maneuver based on the velocity and/or trajectory of the cyclist 1706.

The expressive vehicle system 1700 obtains data associated with at least one object in the environment 1702. In this example, the objects are the other vehicles 1704B-C and the cyclist 1706. As described above with reference to FIG. 12, the expressive vehicle system 1700 can obtain this data from one or more sensors 1710 of the vehicle 1704. In some examples, the sensors 1710 are similar to, or the same as, sensors 1210 of vehicle 1204 described with reference to FIG. 12 above. In some examples, the expressive vehicle system 1700 identifies the one object as the cyclist 1706 and the other objects as vehicles 1704B-C using image classification techniques also described with reference to FIG. 12. For example, the expressive vehicle system 1700 can distinguish the detected objects from each other based on an imaging classification module that receives the object data and outputs data identifying the object. In some examples, the identifying data represents whether the object is a vehicle, a pedestrian, or a cyclist.

In some embodiments, the expressive vehicle system 1700 then determines a distance C between the vehicle 1704A and the cyclist 1706, a distance D between the vehicle 1704A and the vehicle 1704C, and a distance E between the vehicle 1704A and the vehicle 1704B. In this example, the expressive vehicle system 1700 determines that vehicle 1704C is directly in front of vehicle 1704A (e.g., based on both vehicles being in the same lane of the road). Similarly, the expressive vehicle system 1700 determines that vehicle 1704D is directly behind vehicle 1704A (e.g., also based on both vehicles being in the same lane of the road).

In some embodiments, the expressive vehicle system 1700 determines a trajectory of the cyclists 1706 and/or a pose of the cyclist 1706 and uses this data to determine whether to use an expressive maneuver. For example, if the cyclist 1706 is traveling at a constant velocity in a direction parallel to the road, the expressive vehicle system 1700 may determine that the cyclist 1706 does not intend to cross the road. For example, the expressive vehicle system 1700 may determine that the cyclist 1706 is moving at 5 m/s and is heading away from the vehicle. On the other hand, if the cyclist 1706 is decelerating or stopped with a pose that has a vector component in a direction toward the road, the expressive vehicle system 1700 may determine that the cyclist 1706 intends to cross the road and determines to use an expressive maneuver.

In some embodiments, the expressive vehicle system 1700 selects at least one entry condition based on the objects in the environment 1702. In this example, the expressive vehicle system 1700 identifies the cyclists 1706 and the crosswalk 1708 and determines that a deceleration maneuver is required. In turn, the expressive vehicle system 1700 selects the entry conditions for a deceleration maneuver and proceeds to verify that these entry conditions are satisfied. In this example, one entry condition is used to verify that a space 1712 is available to perform the expressive deceleration maneuver. If no vehicle were present in front of vehicle 1704A, then this entry condition would be automatically satisfied (as was the case with the scenario of FIG. 12). On the other hand, if this space 1712 is occupied by another vehicle, or otherwise unavailable, this entry condition will not satisfied and, in turn, the vehicle 1704A will not perform an expressive maneuver to convey the vehicle's 1704A intent to the cyclist 1706. For example, the expressive motion maneuver described with reference to scenario S2 of Table 1 requires 75 meters of space. In such a scenario, if the expressive vehicle system 1700 determines that vehicle 1704C is less than 75 meters away from vehicle 1704A, then the expressive vehicle system 1900 would determine to not use expressive motion behavior.

Similarly, an entry condition is used to verify that a space 1714 is available behind vehicle 1704A. In some examples, this space 1714 is at least 5 meters. If this space 1714 is occupied by another vehicle, or otherwise unavailable, this entry condition will not satisfied and, in turn, the vehicle 1704A will not perform an expressive maneuver to convey the vehicle's 1704A intent to the cyclist 1706. This can help avoid accidents where vehicle 1704B is tail-gating vehicle the 1704A. If no vehicle were present behind vehicle 1704A, then this entry condition would be automatically satisfied (as was the case with the scenario of FIG. 12).

In some embodiments, the expressive vehicle system 1700 determines a trajectory of the vehicle 1704C directly in front of the vehicle 1704A (e.g., based on data generated by the at least one sensors of the vehicle 1704A) to determine whether or not vehicle 1704C is stopping for the cyclist 1706. In some examples, the expressive vehicle system 1700 determines whether the vehicle 1704C is stopping or otherwise decelerating based on the determined trajectory. For example, if the expressive vehicle system 1700 determines that the vehicle 1704C is decelerating and vehicle 1704C is located within a radius of the cyclist 1706 (e.g., within 10 meters), the expressive vehicle system 1700 may determine that vehicle 1704C is stopping for the cyclist 1706 and that an expressive maneuver by vehicle 1704A is unnecessary. On the other hand, if the expressive vehicle system 1700 determines that the vehicle 1704C is maintaining a constant velocity or otherwise not decelerating and/or vehicle 1704C has past the location of the cyclist 1706 (e.g., distance D is greater than distance C), the expressive vehicle system 1700 may determine that vehicle 1704C is not stopping for the cyclist 1706 and that an expressive maneuver by vehicle 1704A is required.

Additionally, as with the pedestrian example of FIG. 12, an entry condition can include a location of crosswalk 1708 being within a predetermined radius to the cyclist 1706 (e.g., 5 meters, 10 meters, and/or the like). For example, if the expressive vehicle system 1700 determines that a crosswalk 1708 does not exist within a radius of the cyclist 1706, then the expressive vehicle system 1700 would determine to not use expressive motion behavior. On the other hand, if the expressive vehicle system 1700 determines that a crosswalk 1708 does exist within a radius of the cyclist 1706, then the expressive vehicle system 1700 would determine to use expressive motion behavior.

Figure 18:
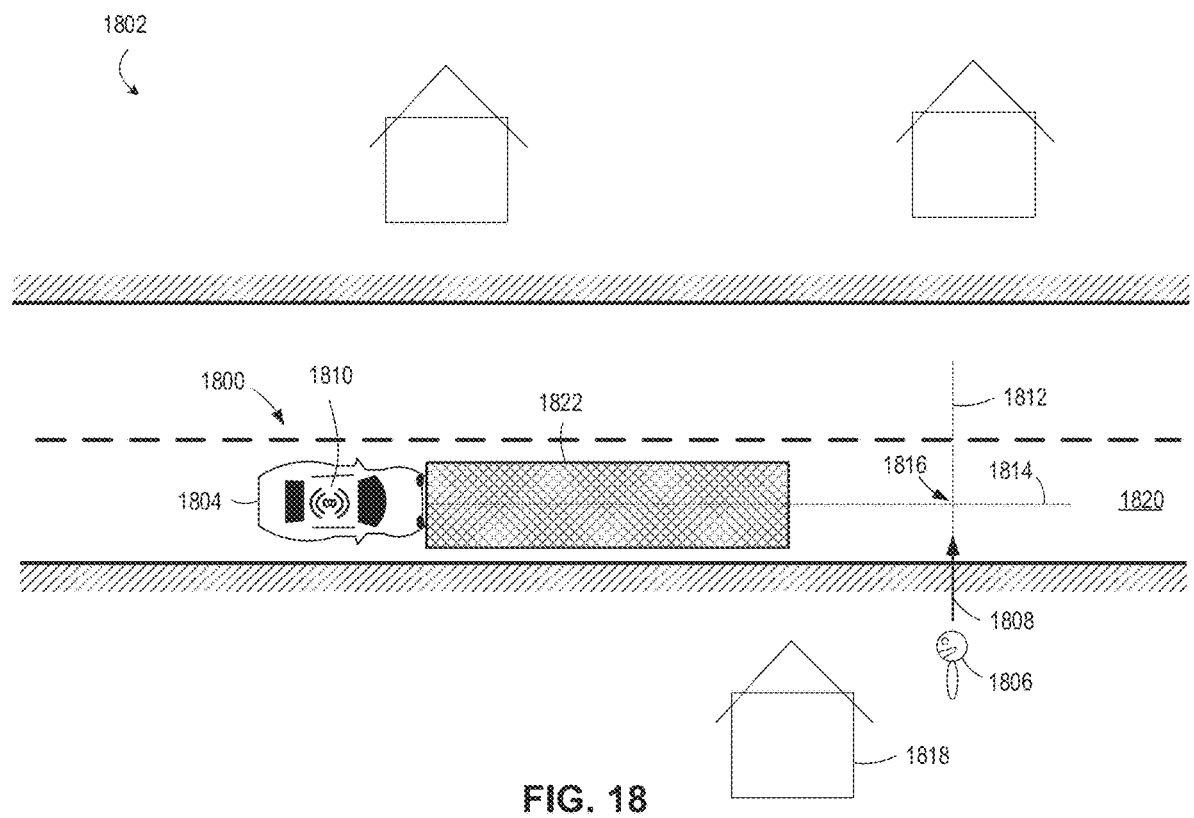
FIG. 18 shows an example scenario of an expressive vehicle system communicating intent to a jaywalker approaching a lane in the path of the vehicle.

FIG. 18 shows an example scenario of an expressive vehicle system 1800 of a vehicle 1804 communicating intent to a jaywalker 1806 approaching a lane 1820 in the path of the vehicle 1804 within an environment 1802. In this scenario, the expressive vehicle system 1800 is the same as any of the expressive vehicle systems described above. Any of the expressive vehicle systems described herein are able to perform the functions of this scenario.

The scenario shown in FIG. 18 is different from the scenarios of FIGS. 12 and 17 in the following ways. The scenario of FIG. 18 includes jaywalker 1806 who is walking in a direction towards the road 1820 without a crosswalk present. The scenario of FIG. 18 also accounts for a trajectory of the jaywalker 1806 and particular neighborhood data to determine a likelihood that the jaywalker 1806 is going to into the path (e.g., the lane 1820) of the vehicle.

The expressive vehicle system 1800 obtains data associated with at least one object in the environment 1802. In this example, the objects are the jaywalker 1806 and homes 1818 in the environment 1802. As described above with reference to FIGS. 12 and 15, the expressive vehicle system 1800 can obtain this data from one or more sensors 1810 of the vehicle 1804. In some examples, the sensors 1810 are similar to, or the same as, sensors 1210 of vehicle 1204 described with reference to FIG. 12 above.

In some examples, the expressive vehicle system 1800 identifies the object as the jaywalker 1806 and the homes 1818 using image classification techniques also described with reference to FIG. 12. For example, the expressive vehicle system 1800 can distinguish the detected objects from each other based on an imaging classification module that receives the object data and outputs data identifying the object. In some examples, the identifying data represents whether the object is a vehicle, a pedestrian, or a cyclist. In this example, the expressive vehicle system 1800 determines that the object is a jaywalker 1806 by (i) receiving an indication that the object is a pedestrian (e.g., via a classification module) and (ii) receiving data that a crosswalk is not present within a radius of the pedestrian (e.g., within a 10 meter radius).

As with the scenario represented in FIG. 17, the expressive vehicle system 1800 determines a trajectory 1808 of the jaywalker 1806 and/or a pose of the jaywalker 1806 and uses this data to determine whether to use an expressive maneuver. For example, if the jaywalker 1806 is traveling at a constant velocity in a direction parallel to the road, the expressive vehicle system 1800 may determine that the jaywalker 1806 does not intend to cross the road 1820. On the other hand, if the jaywalker 1806 is traveling with a velocity in a direction with a vector component toward the road 1820, the expressive vehicle system 1800 may determine that the jaywalker 1806 intends to cross the road 1820 and determines to use an expressive maneuver.

In some embodiments, the expressive vehicle system 1800 determines a likelihood that the jaywalker 1806 is going to intersect the path of the vehicle 1804. In this example, the expressive vehicle system 1800 extrapolates the trajectory 1808 of the jaywalker 1806 (this extrapolation is graphically represented with a line 1812 in FIG. 18). The expressive vehicle system 1800 compares this line 1812 with the planned path of the vehicle 1804 (the planned path is graphically represented by a line 1814 in FIG. 18). The expressive vehicle system 1800 determines an intersection of these two lines 1812, 1814 (this interception point is graphically represented as the intersection point 1816 in FIG. 18). In this example, the expressive vehicle system 1800 determines that the jaywalker 1806 is expected to intersect the path of the vehicle 1804 at the intersection point 1816 based on the planned path of the vehicle 1804 and the trajectory of the jaywalker 1806. In some examples, the planned path of the vehicle 1804 is obtained from a planner of the vehicle 1804.

In some embodiments, the expressive vehicle system 1800 determines a characteristic of the environment 1802. For example, the expressive vehicle system 1800 can determine that some of the objects represent homes 1818 (e.g., via an image classification module as part of a perception module (e.g., the perception module 402 described with reference to FIG. 4)) and use this to determine that the environment 1802 represents a residential neighborhood. In other examples, the expressive vehicle system 1800 can determine that some of the objects represent high-rise buildings (e.g., via the image classification module) and use this to determine that an environment represents an urban neighborhood. In some examples, the expressive vehicle system 1800 determines this characteristic of the environment 1802 based on the obtained geographical data about the environment 1802 (e.g., via a database or map).

In some embodiments, the expressive vehicle system 1800 uses the characteristic of the environment 1802 to determine the likelihood that the jaywalker 1806 is going to walk into the path of the vehicle 1804. For example, the likelihood that a jaywalker 1806 will enter the road 1820 is more common in an urban environment than in a residential environment. In this way, the expressive vehicle system 1800 determines a lower likelihood for urban environments than in residential environments.

In some embodiments, the expressive vehicle system 1800 determines a characteristic of the jaywalker 1806. For example, the expressive vehicle system 1800 can determine that the jaywalker 1806 is a young child (e.g., under 5 years of age) based on the obtained data and use this to determine that the likelihood that the jaywalker 1806 will enter the path of the vehicle 1804 is higher than if the jaywalker 1806 were an adult (e.g., over 18 years of age). In some examples, the expressive vehicle system 1800 determines this age characteristic (e.g., young child [e.g., under age 5], child [e.g., between the ages of 5-11], young adult [e.g., between the ages of 13-17], adult [e.g., over age 18], etc.) based on the height of the jaywalker 1806 (e.g., children are shorter than adults), the sounds of the jaywalker 1806 (e.g., children have higher pitched voices than adults), the velocity of the jaywalker 1806 (e.g., adults can run faster than children), etc.

In some embodiments, the expressive vehicle system 1800 uses the characteristic of the jaywalker 1806 to determine the likelihood that the jaywalker 1806 is going to walk into the path of the vehicle 1804. For example, the likelihood that a jaywalker 1806 will enter the road 1820 is more common for children than for adults. In this way, the expressive vehicle system 1800 determines a lower likelihood for adults compared to children.

In some embodiments, the expressive vehicle system 1800 determines that the object is a jaywalker 1806 by determining that the jaywalker 1806 is already located in the lane 1820 of the vehicle 1804. For example, a jaywalker 1806 could already be walking in the lane 1820 before the vehicle 1804 arrived. This example highlights the fact that it is not necessary for the jaywalker 1806 to be located on the side of the road before the vehicle 1804 arrives.

As with the scenarios represented in FIGS. 12, 15, and 17, the expressive vehicle system 1800 selects at least one entry condition based on the objects in the environment 1802. In this example, the expressive vehicle system 1800 identifies the object as the jaywalker 1806 and selects the entry conditions to include (i) whether the intersection point 1816 lies within the path of the vehicle 1804 and (ii) whether sufficient space 1822 is available to perform an expressive deceleration maneuver. In addition to the entry conditions, the expressive vehicle system 1800 also determines that the environment 1802 is a residential environment and determines that the jaywalker 1806 is a child. In turn, the expressive vehicle system 1800 determines that there is a high likelihood that the jaywalker 1806 will walk/run into the path of the vehicle 1804 and determines that a deceleration maneuver is required.

The expressive vehicle system 1800 then proceeds to verify that these entry conditions are satisfied. In this example, sufficient space 1822 is available to perform an expressive deceleration maneuver and the intersection point 1816 lies within the path of the vehicle 1804. In turn, the expressive vehicle system 1800 proceeds to perform an expressive deceleration maneuver. On the other hand, if the jaywalker 1806 were standing still, then at least some of these entry conditions would not be satisfied, and the expressive vehicle system 1800 would not perform an expressive deceleration maneuver.

In this example, the expressive vehicle system 1800 generates data associated with control of the vehicle 1804 based on the deceleration associated with the expressive maneuver and transmits the data to cause the vehicle 1804 to decelerate based on the deceleration associated with the expressive maneuver and stop prior to the intersection point 1816. This would communicate intent to the jaywalker 1806 that it is safe to cross the path of the vehicle 1804.

Figure 19:
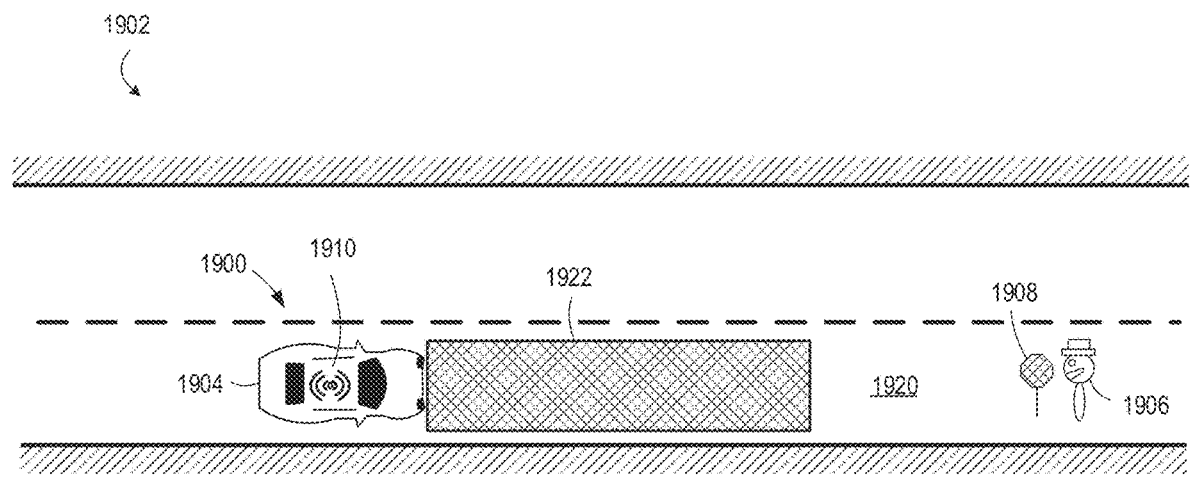
FIG. 19 shows an example scenario of an expressive vehicle system communicating intent to a traffic controller in the path of the vehicle.

FIG. 19 shows an example scenario of an expressive vehicle system 1900 communicating intent to a human traffic controller 1906 in the lane 1920 of the vehicle 1904 within an environment 1902. In this scenario, the expressive vehicle system 1900 is the same as any of the expressive vehicle systems described above. Any of the expressive vehicle systems described herein are able to perform the functions of this scenario.

The scenario shown in FIG. 19 is different from the scenarios above in the following ways. The scenario of FIG. 19 includes a traffic controller 1906 who is standing the road 1920. There are no crosswalks present. In this example, the traffic controller 1906 is holding a traffic sign 1908 that communicates a traffic instruction to the vehicle 1904. In other examples, the traffic controller 1906 uses his/her hands to communicate a traffic instruction to the vehicle 1904 instead of using a traffic sign 1908. Typically the traffic controller 1906 would rely on an acknowledgement of a human driver of the vehicle which may not be possible in an autonomous vehicle without a human driver. This scenario highlights the importance of communicating the intent of vehicle 1904 to the traffic controller 1906.

As with the scenarios described above, the expressive vehicle system 1900 obtains data associated with at least one object in the environment 1902. In this example, the objects are the traffic controller 1906 and traffic sign 1908 in the environment 1902. As with the scenarios described above, the expressive vehicle system 1900 can obtain this data from one or more sensors 1910 of the vehicle 1904. In some examples, the sensors 1910 are similar to, or the same as, sensors 1210 of vehicle 1204 described with reference to FIG. 12 above.

In some embodiments, the expressive vehicle system 1900 determines that the object is a traffic controller 1906 by (i) receiving an indication that the object is a pedestrian (e.g., via a classification module) and (ii) receiving data that a traffic instruction (e.g., a hand-held stop sign 1908) is within a radius (e.g., within 1 meter) of the pedestrian.

In some embodiments, the expressive vehicle system 1900 determines that the object is a traffic controller 1906 when the object is located in the lane 1920 of the vehicle 1904 and a pose of the object is directed towards the vehicle 1904.

In some embodiments, the expressive vehicle system 1900 determines that the object is a traffic controller 1906 when the object is located in the lane 1920 of the vehicle 1904 and a palm of the object is directed towards the vehicle 1904. For example, the expressive vehicle system 1900 determines that the object is a traffic controller 1906 when the expressive vehicle system 1900 determines that the object holding his/her palm in the direction of the vehicle 1804.

In some embodiments, the expressive vehicle system 1900 determines that the object is a traffic controller 1906 when the object is wearing a uniform. For example, the expressive vehicle system 1900 can determine that the object is wearing a police uniform when the uniform of the object matches one or more uniforms of a database of police uniforms within the geographic area of the vehicle 1904. In some examples, these uniforms can include a hat such that the expressive vehicle system 1900 can determine that the object is wearing a police uniform when the object is wearing a hat. In another example, the expressive vehicle system 1900 can determine that the object is wearing a construction uniform when the uniform of the object includes an orange color or one or more regions (e.g., strips) of reflective material.

As with the scenarios described above, the expressive vehicle system 1900 can determine a velocity of the traffic controller 1906 based on the obtained data from the one or more sensors 1910. In some examples, the expressive vehicle system 1900 determines that the traffic controller 1906 is stationary when the velocity is less than a predetermined threshold (e.g., less than 0.1 m/s).

In some embodiments, the expressive vehicle system 1900 determines a traffic instruction based on data about the traffic sign 1908. For example, the expressive vehicle system 1900 can determine the traffic instruction based on a color and/or a shape of the traffic sign 1908. For example, the expressive vehicle system 1900 can determine that the traffic sign 1908 includes an octagon shape and includes a majority of a red color (e.g., based on the image classification) and determine that the traffic instruction is an instruction to stop based on the shape and color of the traffic sign 1908. In another example, the expressive vehicle system 1900 can determine that the traffic sign 1908 includes the word "STOP" (e.g., based on the image classification) and determine that the traffic instruction is an instruction to stop based on the word of the traffic sign 1908.

After the expressive vehicle system 1900 determines that the object is a traffic controller 1906 and determines a traffic instruction associated with the traffic controller 1906, the expressive vehicle system 1900 proceeds to perform an expressive deceleration maneuver to communicate intent to the traffic controller 1906 that the vehicle 1904 understands the traffic instruction and that the vehicle 1904 is stopping. The expressive vehicle system 1900 confirms that each entry condition is satisfied (e.g., sufficient space 1922 exists to perform the deceleration maneuver) and proceeds to generate and transmit data to perform the deceleration maneuver.

Figure 20:
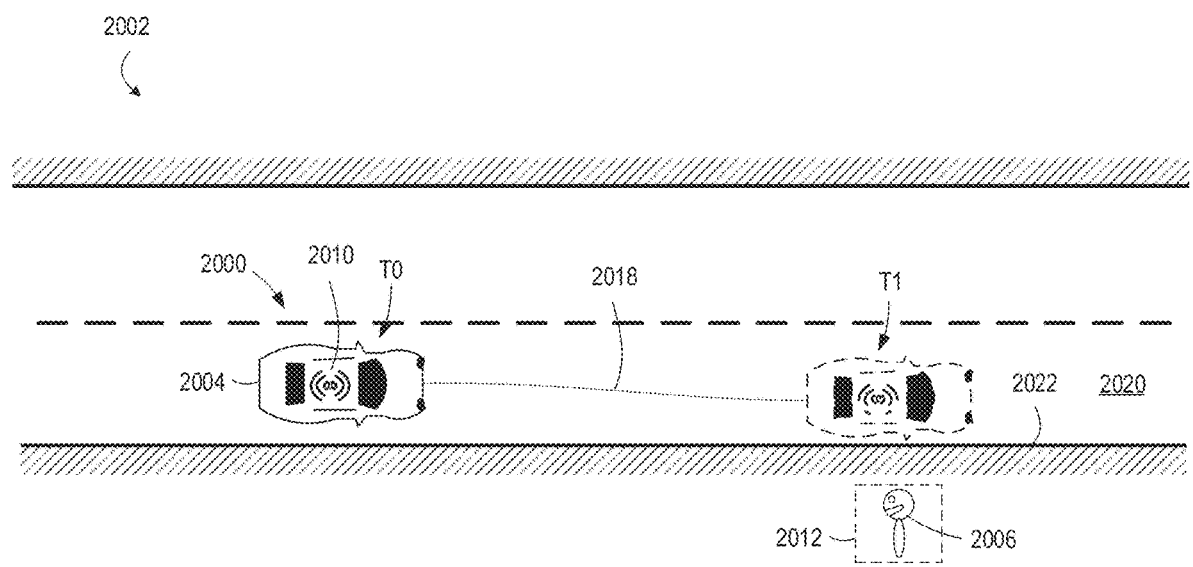
FIG. 20 shows an example scenario of an expressive vehicle system communicating intent to a pedestrian awaiting pick-up by the vehicle.

FIG. 20 shows an example scenario of an expressive vehicle system 2000 of a vehicle 2004 communicating intent to a pedestrian 2006 awaiting pick-up by the vehicle 2004 within an environment 2002. In this scenario, the expressive vehicle system 2000 is the same as any of the expressive vehicle systems described above. Any of the expressive vehicle systems described herein are able to perform the functions of this scenario.

The scenario shown in FIG. 20 is different from all the above scenarios in the following way. The scenario of FIG. 20 includes an expressive maneuver that includes a deceleration and a steering angle variation while all the above scenarios did not include steering angle variation. However, all the expressive vehicle systems described herein can perform an expressive maneuver that includes both a deceleration and a steering angle variation.

Typically the pedestrian 2006 would rely on an acknowledgement of a human driver of the vehicle 2004 that the vehicle 2004 is stopping to let the pedestrian 2006 board the vehicle 2004. Without such acknowledgement, the pedestrian 2006 might hesitate before opening a door of the vehicle 2004 and boarding the vehicle 2004. As noted above with reference to scenario represented in FIG. 19, acknowledgement by a human driver may not be possible in an autonomous vehicle without a human driver. This scenario highlights the importance of communicating the intent of vehicle 2004 to the pedestrian 2006.

In some embodiments, the expressive vehicle system 2000 obtains data about a pick-up location 2012 (e.g., from a planner of the vehicle 2004). In some examples, the data about the pick-up location 2012 represents a location of the pick-up location 2012 relative to the vehicle 2004 (e.g., whether the pick-up location is in front of the vehicle 2004, behind the vehicle 2004, on the right-hand side of the vehicle 2004, on the left-hand side of the vehicle 2004, etc.). In this example, the expressive vehicle system 2000 obtains data that the pick-up location 2012 is 50 meters in front of the vehicle 2004 and to the right-hand side of the vehicle 2004. In some examples, the pick-up location 2012 is continuously updated based on GPS sensor data of an electronic device (e.g., a smartphone) of the pedestrian 2006.

As with the scenarios described above, the expressive vehicle system 2000 obtains data associated with at least one object in the environment 2002. In this example, the object is the pedestrian 2006 in the environment 2002. As with the scenarios described above, the expressive vehicle system 2000 can obtain this data from one or more sensors 2010 of the vehicle 2004. In some examples, the sensors 2010 are similar to, or the same as, sensors 1210 of vehicle 1204 described with reference to FIG. 12 above.

In some embodiments, the expressive vehicle system 2000 determines that the object is a pedestrian 2006 who is waiting to be pick-up by the vehicle 2004 by (i) receiving an indication that the object is a pedestrian (e.g., via a classification module) and (ii) receiving an indication that a pick-up location is within a radius (e.g., within 1 meter) of the pedestrian.

In some embodiments, the expressive vehicle system 2000 determines to use an expressive maneuver 2018 that includes a steering angle variation based on the obtained data. In some examples, the expressive vehicle system 2000 determines to use an expressive maneuver 2018 that includes a steering angle variation when the expressive vehicle system 2000 determines that the object is a pedestrian 2006 who is waiting to be picked-up by the vehicle 2004.

In some embodiments, the expressive vehicle system 2000 determines to use a steering angle variation that biases the vehicle 2004 in the direction of the pedestrian 2006 and/or pick-up location 2012 as the vehicle is decelerating to a stop. In the example shown, the expressive vehicle system 2000 determines to use a steering angle variation that biases the vehicle 2004 to the right-hand side of the lane 2020 based on the location of the pedestrian 2006 and/or pick-up location 2012.

In some embodiments, the expressive vehicle system 2000 determines to use a steering angle variation that causes the vehicle 2004 to approach the curb 2022 of the road as the vehicle is decelerating to a stop. In some examples, this causes the vehicle 2004 to reach a stop within 0.1 meters of the curb 2014. In some examples, the expressive vehicle system 2000 generates an expressive maneuver 2018 with a steering angle variation to cause the vehicle 2004 to drive along an arc-shaped path. In some examples, the expressive vehicle system 2000 generates an expressive maneuver with a steering angle variation to cause the vehicle 2004 to drive along an "S" path.

In some embodiments, the expressive vehicle system 2000 determines to use an expressive maneuver 2018 that includes a deceleration maneuver based on the location of the pedestrian 2006 and/or pick-up location 2012. For example, the expressive maneuver 2018 can represent any of the deceleration profiles describe above. While the above scenarios emphasized stopping at least 5 meters away from the pedestrian, cyclist, traffic controller, etc., this is not necessary in this scenario because the expressive vehicle system 2000 is communicating intent that the vehicle 2004 is stopping to allow the pedestrian 2006 to board the vehicle 2004. The expressive vehicle system 2000 is not communicating intent to allow a pedestrian or cyclist to cross in front of the vehicle or to increase a confidence level of a traffic controller.

In some embodiments, the steering variation is further defined such that, responsive to causing the vehicle 2004 to steer towards both the boundary of the road and the pedestrian 2006, the vehicle 2004 straightens out such that a direction of travel of the vehicle 2004 is parallel with the boundary. In some examples, the expressive maneuver includes a deceleration profile such that the vehicle 2004 stops along the boundary of the road closest to the pedestrian 2006.

In some embodiments, the expressive vehicle system 2000 communicates intent to the pedestrian 2006 via the expressive maneuver and by broadcasting audio using speakers of the vehicle 2004 and by illuminating lights of the vehicle 2004 to inform the pedestrian 2006 that the vehicle is stopping to allow the passenger to enter the vehicle 2004. For example, the expressive vehicle system 2000 can include an audio message to communicate intent to the pedestrian 2006. In some examples, the audio message includes "STAND BACK," "VEHICLE STOPPING," "VEHICLE IS PULLING OVER," and/or "YOUR RIDE IS HERE." etc. Audio/visual aspects of expressive vehicle systems were described with reference to FIG. 15 and any of those aspects can be used with the expressive vehicle system 2000.

In the example shown, the vehicle 2004 performs the expressive maneuver 2018 that causes the vehicle 2004 to decelerate from an initial position at T0 and bias towards the curb 2022 at the location of the pedestrian 2006 at T1. In turn, the pedestrian 2006 would see that the vehicle 2004 has pulled to the side of the road 2020 and has stopped. This increases the confidence in the pedestrian 2006 that the vehicle 2004 is stopping to allow the pedestrian 2006 to board the vehicle 2004.

Figure 21:
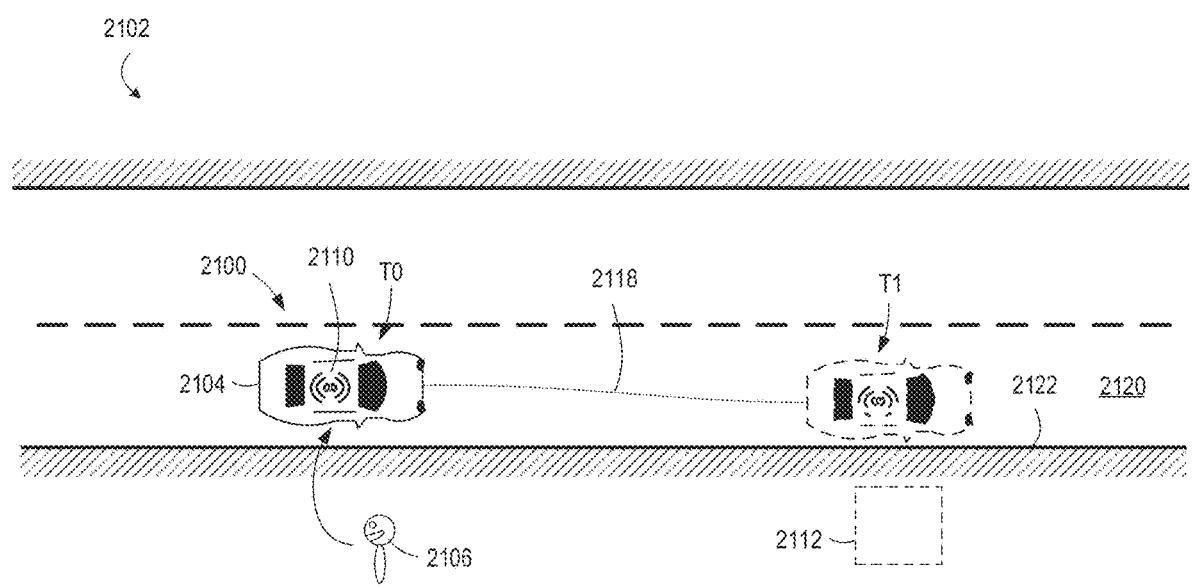
FIG. 21 shows an example scenario of an expressive vehicle system communicating intent to a passenger of the vehicle in route to a drop-off location.

FIG. 21 shows an example scenario of an expressive vehicle system 2100 of a vehicle 2104 communicating intent to a passenger 2016 within the vehicle 2104. In particular, the passenger 2106 is in route to a drop-off location 2112 in the environment 2102. In this scenario, the expressive vehicle system 2100 is the same as any of the expressive vehicle systems described above. Any of the expressive vehicle systems described herein are able to perform the functions of this scenario.

The scenario shown in FIG. 21 is different from the scenario of FIG. 20 in that the pedestrian is a passenger 2106 within the vehicle 2104 and not standing in the environment 2102. This scenario highlights the capabilities of the vehicle 2104 to communicate intent within the vehicle 2104.

As with the scenario represented in FIG. 20, the expressive vehicle system 2100 can obtain data about a drop-off location 2112 (e.g., from a planner of the vehicle 2104). In some examples, the data about the drop-off location 2112 represents a location of the drop-off location 2112 relative to the vehicle 2104 (e.g., whether the pick-up location is in front of the vehicle 2104, behind the vehicle 2104, on the right-hand side of the vehicle 2104, on the left-hand side of the vehicle 2104, etc.). In this example, the expressive vehicle system 2100 obtains data that the drop-off location 2112 is 50 meters in front of the vehicle 2104 and to the right-hand side of the vehicle 2104.

In some embodiments, the expressive vehicle system 2100 determines to use an expressive maneuver 2118 that includes a steering angle variation based on the drop-off location 2112. In some examples, the expressive vehicle system 2100 determines to use an expressive maneuver 2118 that includes a steering angle variation when the expressive vehicle system 2100 determines that a passenger 2106 is within the vehicle 2104 (e.g., via one or more sensor within the vehicle 2104 [e.g., weight sensors, imaging sensors, etc.]).

In some embodiments, the expressive vehicle system 2100 determines to use a steering angle variation that biases the vehicle 2104 in the direction of the drop-off location 2112 as the vehicle 2104 is decelerating to a stop. In the example shown, the expressive vehicle system 2100 determines to use a steering angle variation that biases the vehicle 2104 to the right-hand side of the lane 2120 based on the location of the drop-off location 2112.

In some embodiments, the expressive vehicle system 2100 determines to use an expressive maneuver 2118 that includes a deceleration maneuver based on the location of the drop-off location 2112. For example, the expressive maneuver 2118 can represent the same expressive deceleration profile described above with reference to the scenario of FIG. 20. For example, the expressive vehicle system 2100 can include a deceleration profile that causes the vehicle 2104 to initiate a deceleration earlier than a non-expressive system. In this way, the passenger 2106 would notice that the vehicle 2104 is initiating a stop sooner than a human driver would and this can be used to increase a confidence in the passenger 2106 that the vehicle is stopping for the passenger 2106.

In some embodiments, the expressive vehicle system 2100 communicates intent to the passenger 2106 via the expressive maneuver and by broadcasting audio using speakers within a cabin of the vehicle 2104 and/or by presenting on one or more displays within a cabin of the vehicle 2104 to inform the passenger 2106 that the vehicle 2104 is stopping to allow the passenger 2106 to exit the vehicle 2104. For example, the expressive vehicle system 2100 can include an audio message to communicate intent to the passenger 2106. In some examples, the audio message includes "APPROACHING YOUR STOP," "VEHICLE STOPPING," "VEHICLE IS PULLING OVER," "WE'VE REACHED YOUR DESTINATION," etc.

In the example shown, the vehicle 2104 performs the expressive maneuver 2118 that causes the vehicle 2104 to decelerate from an initial position at T0 and bias towards the curb 2122 at the location of the drop-off location 2112 at T1. In turn, the passenger 2106 would see that the vehicle 2104 has pulled to the side of the road 2120 and has stopped. This increases the confidence in the passenger 2106 that the vehicle 2104 is stopping to allow the passenger 2106 to exit the vehicle 2104.

Figure 22:
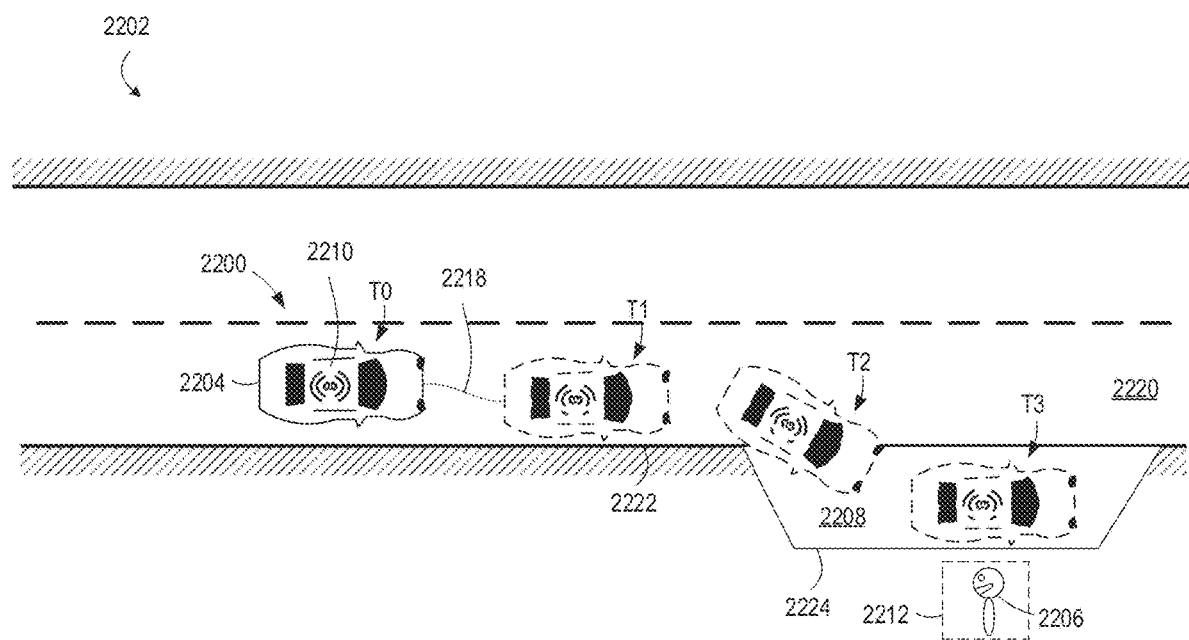
FIG. 22 shows an example scenario of an expressive vehicle system communicating intent to a pedestrian awaiting pick-up by the vehicle.

FIG. 22 shows an example scenario of an expressive vehicle system 2200 of a vehicle 2204 communicating intent to a pedestrian 2206 awaiting pick-up by the vehicle 2204 within an environment 2202. In this scenario, the expressive vehicle system 2200 is the same as any of the expressive vehicle systems described above. Any of the expressive vehicle systems described herein are able to perform the functions of this scenario.

The scenario shown in FIG. 22 is different from the scenario of FIG. 20 in that the vehicle 2204 enters a pick-up area 2208 to pick-up the pedestrian 2206 after the vehicle 2204 biases to the side of a road 2220. In this way, the expressive vehicle system 2200 communicates an intent to pick-up the pedestrian 2206 by decelerating while biasing to the side of the road 2220 and then driving into the pick-up location 2208.

As with the example scenario of FIG. 20, the expressive vehicle system 2200 obtains data about a pick-up location 2212 (e.g., from a planner of the vehicle 2204). The expressive vehicle system 2200 also obtains data associated with at least one object in the environment 2202. In this example, the objects are the pedestrian 2206 and the pick-up area 2208 in the environment 2202. As with the scenarios described above, the expressive vehicle system 2200 can obtain this data from one or more sensors 2210 of the vehicle 2204. In some examples, the sensors 2210 are similar to, or the same as, sensors 1210 of vehicle 1204 described with reference to FIG. 12 above.

In some embodiments, the expressive vehicle system 2200 determines that the object is a pedestrian 2206 who is waiting to be pick-up by the vehicle 2204 by (i) receiving an indication that the object is a pedestrian (e.g., via a classification module) and (ii) receiving an indication that a pick-up location is within a radius (e.g., within 1 meter) of the pedestrian.

In some embodiments, the expressive vehicle system 2200 determines to use an expressive maneuver 2218 that includes a steering angle variation based on the obtained data. In some examples, the expressive vehicle system 2200 determines to use an expressive maneuver 2218 that includes a steering angle variation when the expressive vehicle system 2200 determines that the object is a pedestrian 2206 who is waiting to be picked-up by the vehicle 2204.

In some embodiments, the expressive vehicle system 2200 determines to use a steering angle variation that biases the vehicle 2204 in the direction of the pedestrian 2206 and/or pick-up location 2212 as the vehicle is decelerating to a stop. In the example shown, the expressive vehicle system 2200 determines to use a steering angle variation that first biases the vehicle 2204 to the right-hand side of the lane 2220 (e.g., toward the curb 2222) based on the location of the pedestrian 2206 and/or pick-up location 2212. Then the expressive vehicle system 2200 causes the vehicle 2204 to enter the pick-up area 2208 while continuously decelerating and biasing the vehicle 2204 toward the right-hand side of the pick-up location 2208 (e.g., toward the curb 2224) based on the location of the pedestrian 2206 and/or pick-up location 2212.

In some embodiments, the expressive vehicle system 2200 determines to use a steering angle variation that causes the vehicle 2204 to approach two curbs 2222, 2224 as the vehicle 22204 is decelerating to a stop. In some examples, this causes the vehicle 2204 to reach a stop within 0.1 meters of the both curbs 2222, 2224.

In some embodiments, the expressive vehicle system 2200 determines to use an expressive maneuver 2218 that includes a deceleration maneuver based on the location of the pedestrian 2206 and/or pick-up location 2212. For example, the expressive maneuver 2018 can represent any of the deceleration profiles describe above.

In the example shown, the vehicle 2204 performs the expressive maneuver 2218 that causes the vehicle 2204 to decelerate from an initial position at T0 and bias towards the curb 2222 at a first location at T1. The expressive maneuver 2218 also causes the vehicle 2204 to enter the pick-up area 2208 at T2 while "hugging" the curbs 2222, 2224. The expressive maneuver 2218 also causes the vehicle 2204 to drive to the position of the pedestrian 2206 while also biasing towards the curb 2224 at a second location at T3. In turn, the pedestrian 2206 would see that the vehicle 2204 has pulled into the pick-up area 2208 and has stopped. This increases the confidence in the pedestrian 2206 that the vehicle 2204 is stopping to allow the pedestrian 2206 to board the vehicle 2204.

Figure 23:
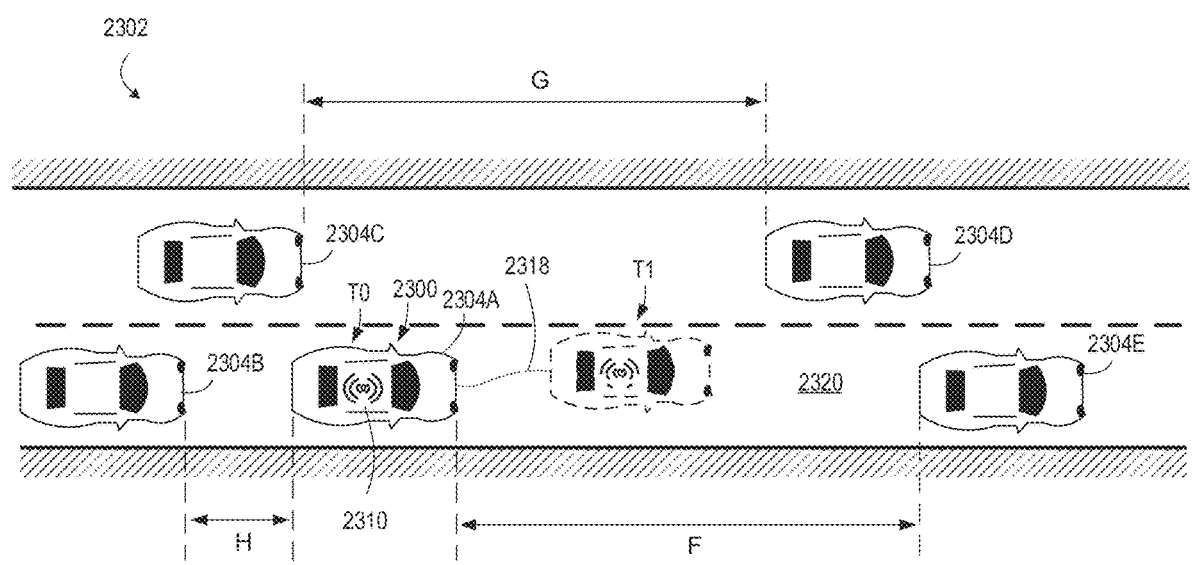
FIG. 23 shows an example scenario of an expressive vehicle system communicating intent to other vehicles during a lane change.

FIG. 23 shows an example scenario of an expressive vehicle system 2300 of a vehicle 2304A communicating intent to other vehicles 2304B-D during lane change maneuver to avoid a parked vehicle 2304E in an environment 2302. In this scenario, the expressive vehicle system 2300 is the same as any of the expressive vehicle systems described above. Any of the expressive vehicle systems described herein are able to perform the functions of this scenario.

The scenario shown in FIG. 23 is different from the scenarios described above in the following ways. The scenario of FIG. 23 obtains data about other vehicles and biases the vehicle 2304A in a lane 2320 to communicate intent to the other vehicles. The vehicle 2304A is also biased towards the center of the road to communicate intent to change lanes. In this way, the other vehicles can "see" the biased position of the vehicle 2304A and understand that the vehicle 2304A intends to change lanes.

In some embodiments, the expressive vehicle system 2300 obtains data that a lane change is necessary and/or recommended (e.g., from a planner of the vehicle 2304A). In some examples, the expressive vehicle system 2300 obtains data that a vehicle ahead (e.g., vehicle 2304E) is disabled or traveling below the speed limit of the lane 2320 (e.g. obtained via the sensors 2310 of the vehicle 2304). In other examples, a lane change is necessary to best position the vehicle 2304 for an upcoming turn (e.g., the vehicle 2304A moves into the left-most lane to get ready to take an upcoming left-hand turn). Again, this data can be obtained from a planner of the vehicle 2304

As with the example scenarios described above, the expressive vehicle system 2300 also obtains data associated with at least one object in the environment 2302. In this example, the objects are the other vehicles 2304B-E in the environment 2302. As with the scenarios described above, the expressive vehicle system 2300 can obtain this data from one or more sensors 2310 of the vehicle 2304. In some examples, the sensors 2310 are similar to, or the same as, sensors 1210 of vehicle 1204 described with reference to FIG. 12 above.

In some embodiments, the expressive vehicle system 2200 obtains position and trajectory data of detected objects in a lane adjacent to the lane 2320 of the vehicle 2304A. In this example, the expressive vehicle system 2300 receives position and trajectory data about vehicle 2304C and vehicle 2304D and a space between vehicle 2304C and vehicle 2304D. In this example, the space between vehicle 2304C and vehicle 2304D is graphically represented by distance G.

In some embodiments, the expressive vehicle system 2300 determines whether space exists for the vehicle 2304A to merge into the adjacent lane. In some examples, the expressive vehicle system 2300 determines that space exists for the vehicle 2304A to merge into the adjacent lane when distance G is greater than two vehicle lengths. In some examples, the expressive vehicle system 2300 determines that space exists for the vehicle 2304A to merge into the adjacent lane when vehicle 2304C is not accelerating based on the trajectory data and/or when vehicle 2304D is not decelerating based on the trajectory data.

In some embodiments, the expressive vehicle system 2300 communicates intent to the vehicles 2404B-E by performing an expressive maneuver 2318 with a steering angle variation. For example, the expressive vehicle system 2300 can include an expressive maneuver 2318 that includes a deceleration and a steering angle variation that biases the vehicle 2304A in a direction toward the adjacent lane that the vehicle 2304A intends to change lanes to. In some examples, the expressive maneuver 2318 includes a lateral acceleration to indicate intention to change lanes.

In some examples, the communicated intent is intended for human drivers of the vehicles 2404B-E. However, in other examples, the communicated intent is intended to be received by sensors of the vehicles 2404B-E. In some examples, the expressive vehicle system 2200 determines to use an expressive maneuver 2218 that includes a steering angle variation when at least one vehicle is present in a lane that the vehicle 2304A intends to change lanes to.

In some embodiments, the expressive vehicle system 2300 communicates intent by flashing blinkers of the vehicle 2304A and performing the expressive maneuver 2318. For example, the expressive vehicle system 2300 can cause the left-turn blinkers to flash while performing the expressive maneuver 2318.

In some embodiments, the expressive vehicle system 2300 obtains data about a space around the vehicle 2304A and this space represents an amount of clearance between the vehicle 2304A and other vehicles. In some examples, the expressive vehicle system 2300 receives data about a space between the vehicle 2304A and a vehicle 2304B directly behind vehicle 2404A (which is graphically represented as distance H in FIG. 23). In some examples, the expressive vehicle system 2400 also receives data about a space between the vehicle 2404A and a vehicle 2404E directly ahead of vehicle 2404A (which is graphically represented as distance F in FIG. 23).

In some embodiments, the expressive vehicle system 2300 determines that an acceleration (or deceleration) is necessary in order to merge into the adjacent lane. In some examples, the expressive vehicle system 2300 determines that the acceleration (or deceleration) is necessary in order to merge into the adjacent lane based on the trajectory of the vehicle 2304A and vehicles 2304C-D. In some examples, the expressive vehicle system 2300 determines the expressive behavior to include expressive, animated lights on the wheels of the vehicle 2404A to indicate intention to accelerate (or decelerate) when the expressive vehicle system 2400 determines that the acceleration (or deceleration) is necessary in order to merge into the adjacent lane. In some examples, the animated lights on the wheels include a ring of LED lights around the rims of the wheels as described with reference to FIG. 16 above. In some examples, the LED lights pulse a color (e.g., white, red, etc.) to obtain the attention of the drivers of vehicles 2404C-D.

Figure 24:
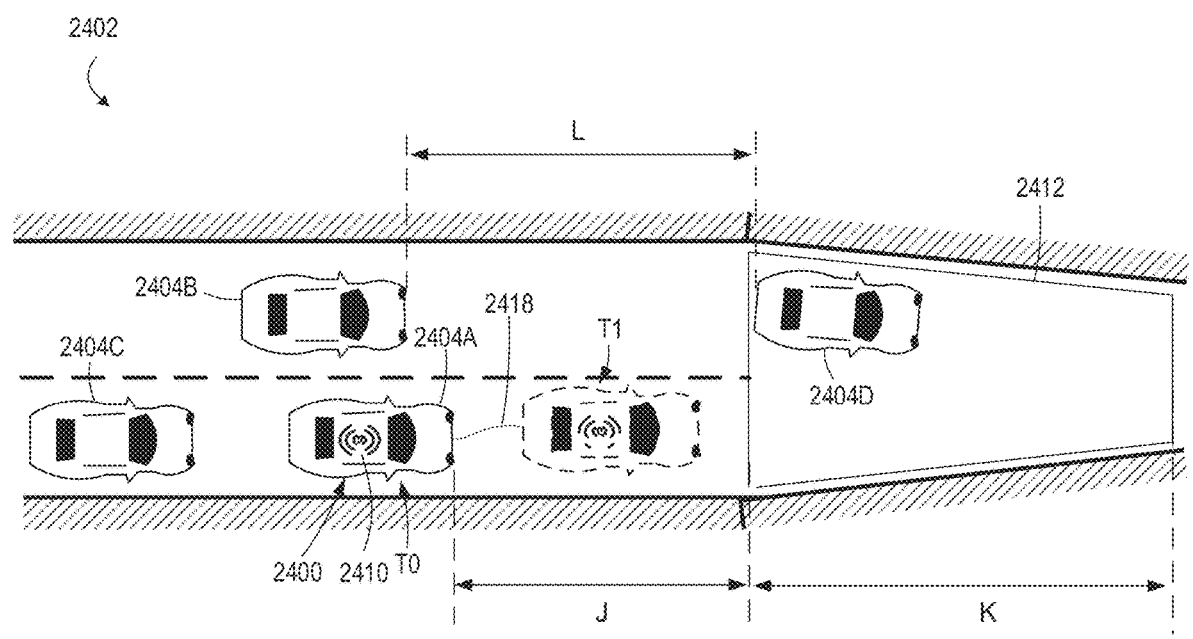
FIG. 24 shows an example scenario of an expressive vehicle system communicating intent to other vehicles while merging traffic.

FIG. 24 shows an example scenario of an expressive vehicle system 2400 of a vehicle 2404A communicating intent to other vehicles 2404B-D while merging lanes in an environment 2402. In this scenario, the expressive vehicle system 2400 is the same as any of the expressive vehicle systems described above. Any of the expressive vehicle systems described herein are able to perform the functions of this scenario. The scenario shown in FIG. 24 is different from the scenario of FIG. 23 in that the vehicle 2400A intends to merge lane instead of change lanes.

In some embodiments, the expressive vehicle system 2400 obtains data that a lane merge region 2412 is ahead (e.g., from a planner of the vehicle 2404A, one of more sensors of the vehicle 2404A, etc.). For example, the expressive vehicle system 2400 can obtain data that all vehicles ahead are merging lanes based on data obtained by one or more sensors of the vehicle 2404A. In another example, the expressive vehicle system 2500 can receive data about the lane merge region 2512 from a map.

As with the example scenarios described above, the expressive vehicle system 2400 also obtains data associated with at least one object in the environment 2402. In this example, the objects are the other vehicles 2404B-D in the environment 4302. As with the scenarios described above, the expressive vehicle system 2400 can obtain this data from one or more sensors 2410 of the vehicle 2404A. In some examples, the sensors 2410 are similar to, or the same as, sensors 1210 of vehicle 1204 described with reference to FIG. 12 above.

In some examples, the expressive vehicle system 2400 determines to perform an expressive maneuver 2418 that imitates a deceleration earlier than a typical human driver would to communicate intent to vehicle 2404B that the vehicle 2404A intends to merge ahead of vehicle 2404A.

In some embodiments, the expressive vehicle system 2400 receives data about a distance L between two vehicles in an adjacent lane to the vehicle 2404A. In some examples, the expressive vehicle system 2400 determines whether to merge lanes between vehicles in the adjacent lane or decelerate and merge lanes after the vehicles in the adjacent lanes have passed vehicle 2404A.

In some embodiments, the expressive vehicle system 2400 determines the expressive behavior/maneuver based on distances J and/or distance K and/or distance L. In some examples, the expressive vehicle system 2400 determines to merge between vehicles 2404C and 2404D in the merge lane region 2412. In this example, the expressive vehicle system 2400 determines to use the left-turn blinker of the vehicle 2404A to communicate intent to vehicle 2408B and vehicle 2404C as described above with reference to FIG. 23.

Figure 25:
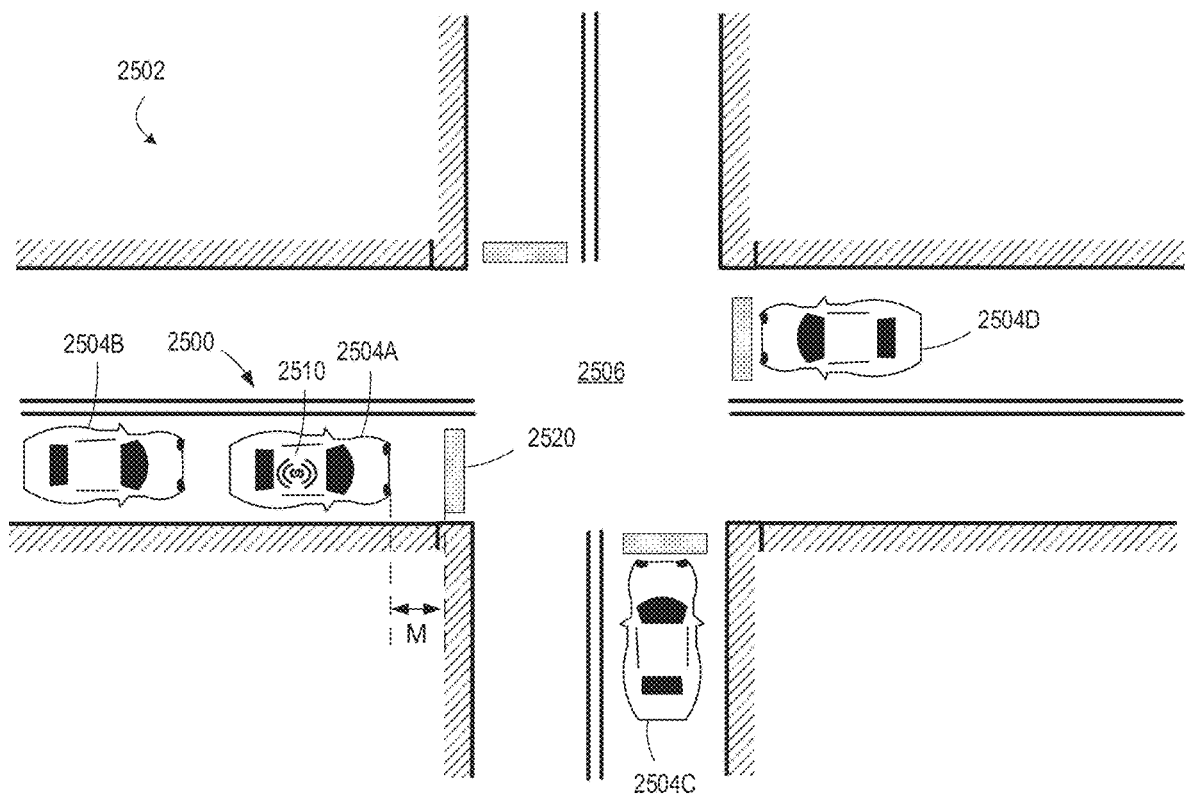
FIG. 25 shows an example scenario of an expressive vehicle system communicating intent to other vehicles at a four-way intersection.

FIG. 25 shows an example scenario of an expressive vehicle system 2500 of a vehicle 2504A communicating intent to other vehicles 2504B-D at a four-way intersection 2506 in an environment 2502. In this scenario, the expressive vehicle system 2500 is the same as any of the expressive vehicle systems described above. Any of the expressive vehicle systems described herein are able to perform the functions of this scenario.

The scenario shown in FIG. 25 is different from the above scenarios in the following ways. The scenario of FIG. 25 represents a vehicle 2504A that is approaching an intersection 2506 and is communicating intent to the other vehicles 2504C, 2504D at the intersection 2506. In some examples, the vehicle 2504A communicates intent to let the other vehicles know that those vehicles have the right of way and also to let the other vehicles know when vehicle 2504A intents do enter the intersection 2506.

In this example, the expressive vehicle system 2500 obtains data that a four-way intersection 2506 is ahead of vehicle 2504A. In some examples, expressive vehicle system 2500 obtains this data from a map or by determining that one or more traffic lights are present.

As with the example scenarios described above, the expressive vehicle system 2500 obtains data associated with at least one object in the environment 2502. In this example, the objects are the other vehicles 2504B-D in the environment 2502 and could also be one or more traffic lights of the intersection 2506. As with the scenarios described above, the expressive vehicle system 2500 can obtain this data from one or more sensors 2510 of the vehicle 2504A. In some examples, the sensors 2510 are similar to, or the same as, sensors 1210 of vehicle 1204 described with reference to FIG. 12 above.

In some embodiments, the expressive vehicle system 2500 determines an expressive maneuver that causes the vehicle 2504A to stop a distance M before the stop lane marker 2520. When the other vehicles 2504C, 2504D "see" that vehicle 2504A has stopped distance M before the lane marker 2520, the other vehicles 2504C, 2504D have an increased confidence that vehicle 2504A is not going to enter the intersection 2506 out of turn. In some examples, distance M is 5 meters. In some examples, distance M is 15 meters.

In some embodiments, the expressive vehicle system 2500 determines a state of each vehicle at the four-way intersection 2506. In some examples, the expressive vehicle system 2500 determines the expressive behavior/maneuver based on the state of the vehicles at the four-way intersection 2506. In some examples, the expressive vehicle system 2500 receives data about whether the other vehicles 2504C, 2504D are stopped, how long of a duration the vehicles 2504C, 2504D have been stopped, and/or whether the other vehicles 2504C, 2504D have a turn-signal blinker turned on.

In some embodiments, the expressive vehicle system 2500 determines an expressive maneuver that causes the vehicle 2504A to move closer to the stop marker 2520 when the vehicle 2504A determines that it is the vehicle's 2504A turn to go in the intersection 2506. For example, the expressive maneuver can be defined such that the vehicle 2504A moves incrementally closer to the stop marker 2520 after each vehicle 2504C, 2504D at the intersection 2506 has gone (e.g., by obtaining data that the vehicles are no longer present at the intersection 2506). When all vehicles are no longer present, vehicle 2504A is at the stop marker 2520 and proceeds to go through the intersection 2506.

In some embodiments, the expressive vehicle system 2500 communicates intent to the other vehicles 2504C, 2504D by turning a blinker on, transmitting audio messages, presenting one or more messages on displays, using one or more lights, and/or transmitting data via a wireless protocol (e.g., Wi-Fi, Bluetooth, FM, AM, etc.).

The above example scenarios illustrated how expressive vehicle systems can be used in real-world scenarios. The following details illustrate how the expressive vehicle systems described herein can be implemented within an A/V stack of a vehicle.

Figure 26:
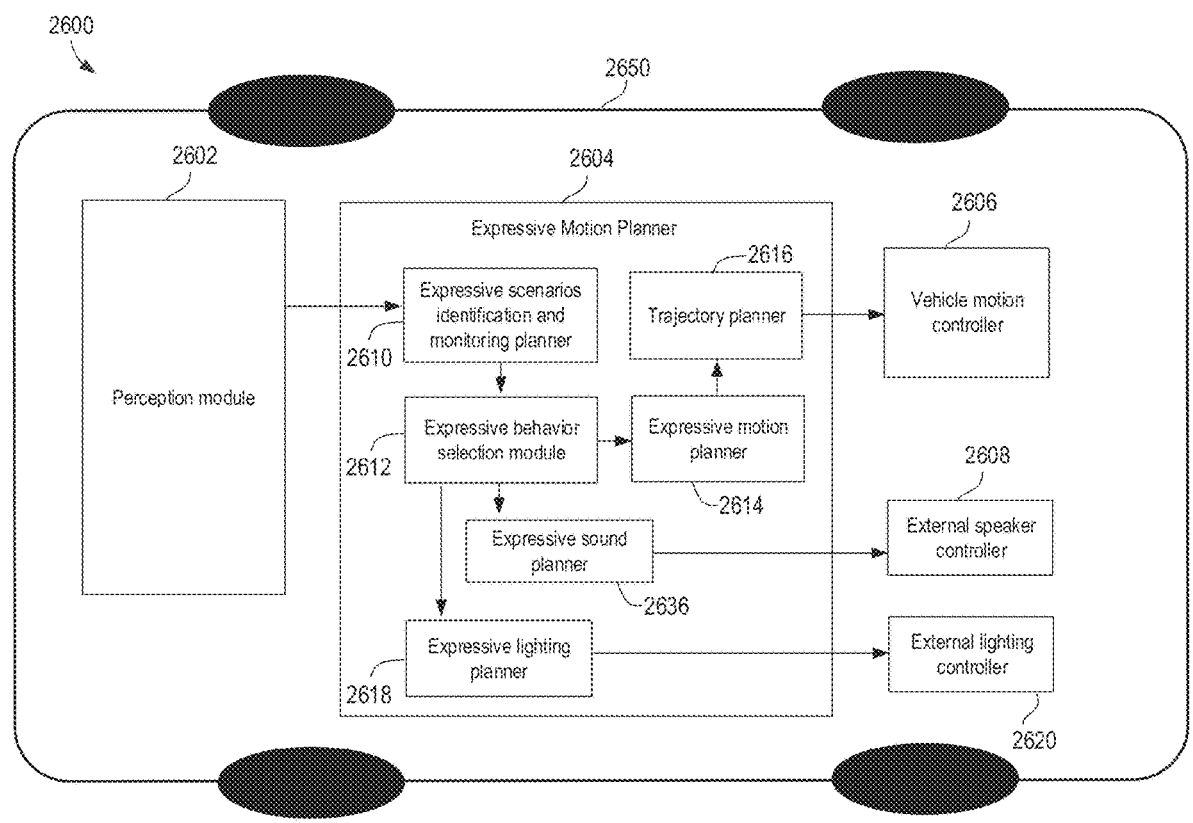
FIG. 26 shows a block diagram of an expressive vehicle system.

FIG. 26 shows a vehicle 2650 configured to execute an expressive vehicle system 2600. In some examples, the vehicle 2650 is the same as, or similar to, any of the vehicles described herein. The expressive vehicle system 2600 includes a perception module 2602, an expressive motion planner 2604, a vehicle motion controller 2606, an external speaker controller 2608, and an external lighting controller 2620. In some examples, the perception module 2602 is the same as, or similar to, the perception module 402. Outputs from the perception module 2602 are input into the expressive motion planner 2604.

The expressive motion planner 2604 includes an expressive scenarios identification and monitoring planner 2610, an expressive behavior selection module 2612, an expressive motion planner 2614, a trajectory planner 2616, an expressive sound planner 2636, and an expressive lighting planner 2618. In some examples, the expressive scenarios identification and monitoring planner 2610 performs the function of identifying objects. In some examples, the expressive motion planner 2614 determines one or more expressive maneuvers for communicating intention. In some examples, the trajectory planner 2616 determines the trajectory of the expressive maneuver. The vehicle motion controller 2606 controls the vehicle 2650 to perform the determined maneuvers for communicating intention.

In some examples, the expressive sound planner 2636 determines one or more sounds for communicating intention. The external speaker controller 2608 controls the speakers to transmit one or more sounds for communicating intention. In some examples, the expressive lighting planner 2618 determines one or more lighting patterns for communicating intention. The external lighting controller 2620 controls the lights to illuminate for communicating intention (e.g., by illuminating the lights on a wheel of the vehicle 2650 as described with reference to FIG. 16).

Figure 27:
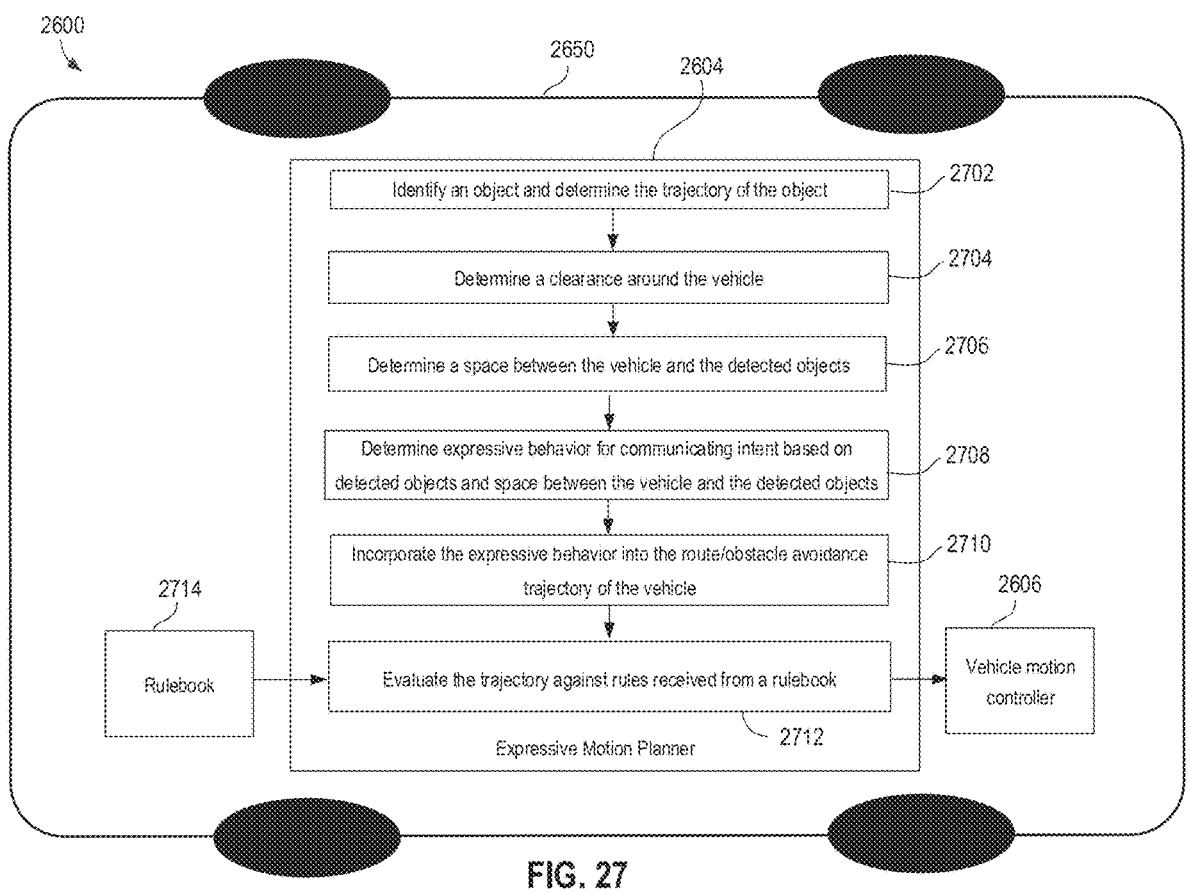
FIG. 27 shows a block diagram with additional details of an expressive vehicle system.

FIG. 27 shows a flow chart of the functions of the expressive motion planner 2604 as part of the expressive vehicle system 2600 described with reference to FIG. 26. At step 2702, the expressive motion planner 2604 identifies an object and determines the trajectory of the object. In some examples, the expressive vehicle system 2600 identifies the object using the at least one sensor of the vehicle 2650 (e.g., the same as or similar to the at least one sensor 1210 of vehicle 1204 described with reference to FIG. 13). In some examples, the expressive vehicle system 2600 identifies the object as a pedestrian, cyclist, jaywalker, traffic controller, vehicle, homes, pick-up/drop-off area, intersection, lane merge area, etc., based on obtained data in association with an image classification, as described using the various example scenarios herein.

In some embodiments, the expressive motion planner 2604 identifies a scenario based on the object and data received from the at least one sensor of the vehicle 2650 (e.g., the at least one sensor 1210 represented in FIG. 14). In some examples, the expressive motion planner 2604 determines that the scenario is an upcoming intersection, a lane merge, a lane change, a traffic controller, an upcoming drop-off/pick-up area, a cyclist crossing at a crosswalk, a pedestrian crossing at a crosswalk, or a jaywalker scenario based on obtained data as described using the various example scenarios herein.

At step 2704, the expressive motion planner 2604 determines a clearance around the vehicle 2750 to ensure there is space for performing maneuvers and/or a line of sight path between the detected object and the vehicle 2750 for observing the communicated intent. In some examples, the expressive motion planner 2604 determines a clearance 360° around the vehicle 26500 using the at least one sensors of the vehicle 2650. In some examples, the expressive motion planner 2604 determines the clearance around the vehicle 2650 after the expressive motion planner 2604 identifies the scenario.

At step 2706, the expressive motion planner 2604 determines a space between the vehicle and the detected objects. For example, if the detected object is another vehicle, the expressive motion planner 2604 determines a space between the vehicle and each other vehicle within the environment. If the detected object is a pedestrian or cyclist, the expressive motion planner 2604 determines a distance from the vehicle 2650 to the pedestrian or the cyclist. In some examples, the expressive motion planner 2604 determines a space between the vehicle 2650 and a vehicle in front of the vehicle 2650. In some examples, the expressive motion planner 2604 determines a space between the vehicle 2650 and a vehicle behind of the vehicle 2650. In some examples, the expressive motion planner 2604 determines a space between the vehicle 2650 and a vehicle to the left-hand-side of the vehicle 2650. In some examples, the expressive motion planner 2604 determines a space between the vehicle 2650 and a vehicle to the right-hand-side of the vehicle 260.

At step 2708, the expressive motion planner 2604 determines the expressive behavior for communicating intent based on detected objects and space between the vehicle and the detected objects. In some embodiments, the expressive motion planner 2604 determines the expressive behavior to include a time series steering, braking, throttle, signal blinkers, headlights, animated lighting, and/or audio commands. In some embodiments, the expressive motion planner 2604 determines the expressive behavior to include expressive lateral movement (e.g., early lateral acceleration) to indicate intention to change lanes. In some embodiments, expressive motion planner 2604 determines the expressive behavior to include expressive, animated lights on the wheels of the vehicle 2650 to indicate intention to accelerate, even when the vehicle 2650 is at standstill and/or a low speed. In some embodiments, expressive motion planner 2604 determines the expressive behavior to include expressive, animated lights on the wheels of the vehicle 2650 to indicate intention to decelerate, even when the vehicle 2650 is not decelerating.

In some embodiments, the expressive motion planner 2604 determines to perform a swerve motion maneuver when there are no other vehicles to the left- and right-hand side of the vehicle 2650. In some examples, the expressive motion planner 2604 determines to perform a controlled deceleration maneuver when there are no other vehicles in front of the vehicle 2650. In some examples, the expressive motion planner 2604 determines to use animated light behavior (e.g., blinkers, flashing lights) when the vehicle 2650 has a line-of-sight to the detected object and the detected object is within a predetermined distance from the vehicle 2650 (e.g., not too far to see (or otherwise observe) the animated light behavior). In some examples, the expressive motion planner 2604 determines to use audio behavior (e.g., via the speakers or sirens of the vehicle) when the detected object is within a predetermined distance from the vehicle 2650 (e.g., not too far to hear (or otherwise observe) the animated light behavior).

In some embodiments, the expressive motion planner 2604 determines expressive behavior for communicating intent when the expressive motion planner 2604 determines that a line of sight path between the detected object and the vehicle 2650 exists for observing the communicated intent. In some embodiments, the expressive motion planner 2604 determines homotopies with a set of behavior constraints as part of the expressive behavior.

At step 2710, the expressive motion planner 2604 incorporates the expressive behavior into the route/obstacle avoidance trajectory of the vehicle 2650. For example, if the expressive behavior that includes a steering angle variation (e.g., an "S" maneuver or an arc-shaped maneuver), the expressive motion planner 2604 incorporates the steering angle variation maneuver into the trajectory of the vehicle 2650 so the vehicle 2650 performs the steering angle variation maneuver as part of the trajectory of the vehicle 2650. In most cases, the trajectory of the vehicle 2650 is a superset of the expressive behavior.

At step 2712, the expressive motion planner 2604 evaluates the trajectory against rules received from a rulebook 2714 of the vehicle. In some examples, the rules are rules of the road, rules of passenger comfort, and/or rules of expression. In some examples, rules of the road define whether or not a particular maneuver is permitted in the lane of travel of the vehicle 2650 and/or the environment of the vehicle 2650. For example, the rulebook can include a rule that changing lanes is prohibited in construction zones. In turn, the expressive vehicle system 2600 will not perform a maneuver that requires a lane change. In some examples, rules of passenger comfort define whether or not a particular passenger within the vehicle 2650 has motion sickness and is sensitive to high 'g' forces.

For example, the rulebook can include a rule that accelerations and decelerations greater than 0.10 g in magnitude based on a passenger comfort preference. In turn, the expressive vehicle system 2600 will not perform accelerations and decelerations greater than 0.10 g. However, the expressive motion planner 2604 can override the rulebook in the case of emergencies (e.g., to avoid a collision). In some examples, the rules of expression define whether a particular expression is permitted. For example, the rulebook can include a rule that loud sounds (e.g., greater than 80 dBA) are prohibited at nighttime (e.g., between 10 PM and 6 AM local time) in residential neighborhoods. In turn, the expressive vehicle system 2600 will not broadcast loud sounds using the speakers of the vehicle at nighttime in residential neighborhoods.

After steps 2702, 2704, 2706, 2708, 2710, and 2712 are completed, the expressive vehicle system 2600 sends the expressive behavior trajectory to the vehicle motion controller 2726 to control the vehicle 2650 to perform the expressive behavior trajectory. While not explicitly shown in FIG. 27, the expressive vehicle system 2600 also sends the expressive behavior to the external speaker controller 2608 and external lighting controller 2620 described with reference to FIG. 26.

Figure 28:
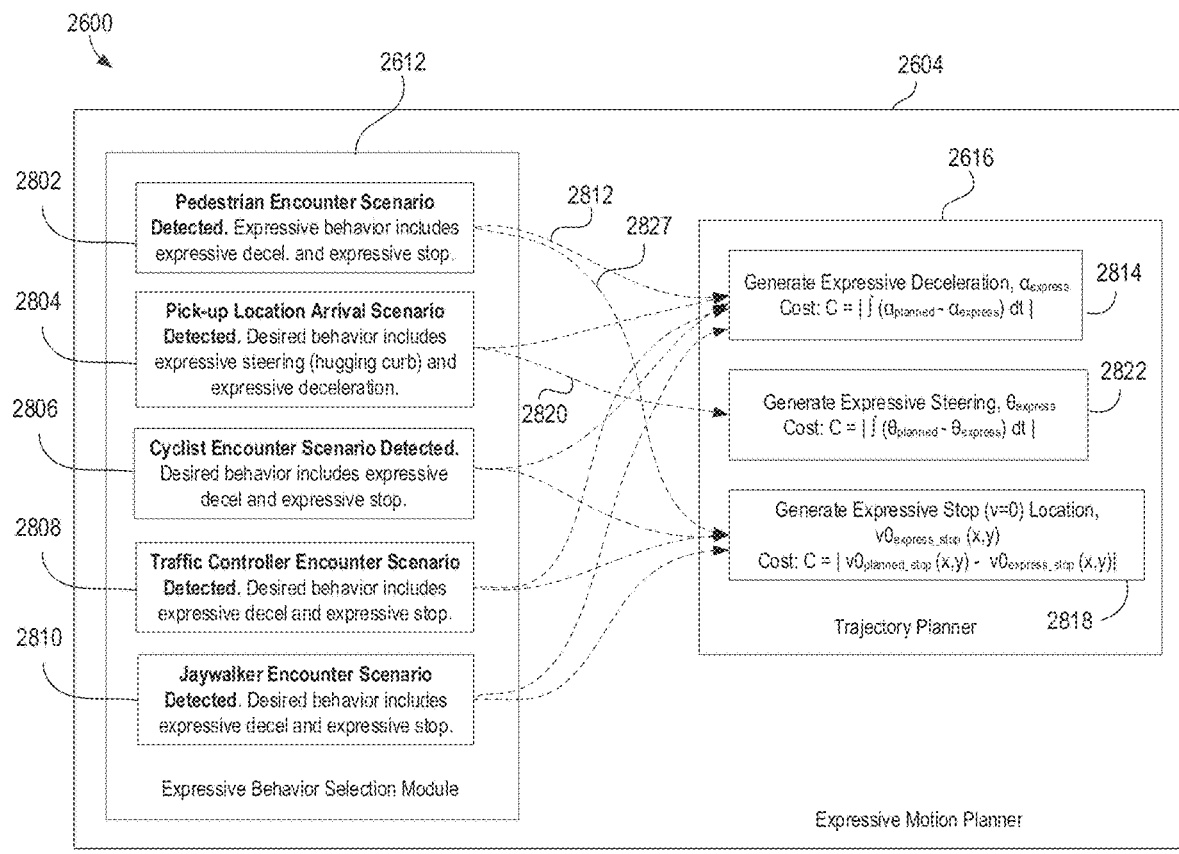
FIG. 28 shows a block diagram of calculations as part of a trajectory planner of an expressive vehicle system.

FIG. 28 shows a block diagram of calculations as part of the trajectory planner 2616 of the expressive vehicle system 2600 and how the calculations are based on the expressive behavior selection module 2612. Furthermore, the expressive behavior selection module 2612 is based on which scenario is detected. In particular, five scenarios of the expressive behavior selection module 2612 are shown in FIG. 28. These five scenarios include a pedestrian encounter scenario 2802 (as illustrated in FIGS. 12 and 15), a pick-up location arrival scenario 2804 (as illustrated in FIGS. 20 and 22), a cyclist encounter scenario 2806 (as illustrated in FIG. 17), a traffic controller encounter scenario 2808 (as illustrated in FIG. 19), and a jaywalker encounter scenario 2810 (as illustrated in FIG. 18). In some examples, the actions of the expressive behavior selection module 2612 are performed as part of step 2708 (shown in FIG. 27) of the expressive vehicle system 2600.

Once the expressive vehicle system 2600 determines the expressive behavior, the expressive vehicle system 2600 sends the expressive behavior to the trajectory planner 2626. In some examples, the actions of the trajectory planner 2626 are performed as part of step 2710 (shown in FIG. 27) of the expressive vehicle system 2600.

In the pedestrian encounter scenario 2802, the trajectory planner 2626 generates, at step 2814, an expressive deceleration, $\alpha_{express}(t)$, and a cost function representing an amount of change relating the planned vehicle's deceleration to the expressive deceleration. This is represented by flow path 2812. In some examples, the expressive vehicle system 2600 determines the cost function based on:

$$C = |\int (\alpha_{planned}(t) - \alpha_{express}(t)) dt|$$

In the above equation, $\alpha_{planned}(t)$ is the planned deceleration of the vehicle for the same time period without considering the expressive behavior (e.g., this is the planned deceleration if an expressive vehicle system was not used). Larger values of cost, C, represent larger amounts of change to the deceleration profile of the vehicle relative to the planned vehicle trajectory.

Continuing with the pedestrian encounter scenario 2802, the trajectory planner 2626 also generates, at step 2818, an expressive stop, $v0_{express\,stop}(x, y)$, and a cost function based on:

$$C = |v0_{planned\,stop}(x,y) - v0_{express\,stop}(x,y)|$$

In the above equation, $v0_{planned\,stop}(x, y)$ is the planned stopping position of the vehicle without considering the expressive behavior. Larger values of cost, C, represent larger amounts of change to vehicle's stopping position relative to the planned vehicle trajectory.

In some embodiments, the expressive vehicle system 2600 evaluates the trajectory against rules received from a rulebook based on the cost functions. In some examples, this step is performed as part of step 2712 described with reference to FIG. 27.

The pick-up location arrival scenario 2804 represents the scenario described above with reference to FIGS. 20 and 22. c the trajectory planner 2626 generates, at step 2822, an expressive steering, $\theta_{express}(t)$, and a cost function representing an amount of change relating the planned vehicle's steering to the expressive steering. This is represented by path 2820. In some examples, the expressive vehicle system 2600 determines the cost function based on:

$$C = |\int (\theta_{planned}(t) - \theta_{express}(t)) dt|$$

In the above equation, $\theta_{planned}(t)$ is the planned steering of the vehicle for the same time period without considering the expressive behavior (e.g., this is the planned steering if an expressive vehicle system was not used). Larger values of cost, C, represent larger amounts of change to the steering profile of the vehicle relative to the planned vehicle trajectory.

Figure 29:
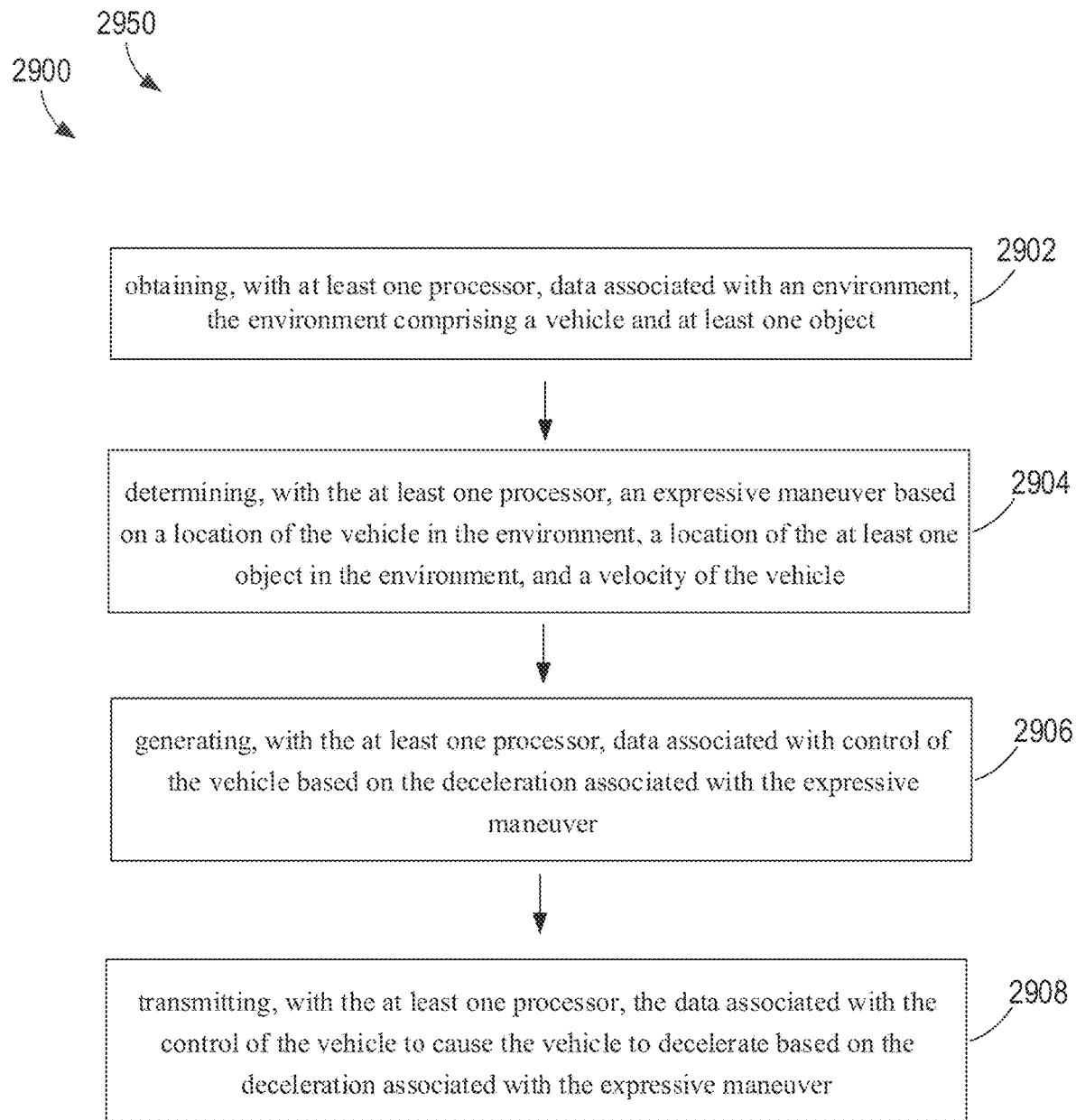
FIG. 29 shows a flow chart of a method of an expressive vehicle system.

FIG. 29 is a flowchart of operations 2950 performed by an expressive vehicle system 2900. In some examples, the expressive vehicle system 2900 is the same, or similar to, any of the expressive vehicle systems described herein.

In some embodiments, the expressive vehicle system 2900 obtains, at step 2902, data associated with an environment (e.g., data generated by a LiDAR system, a radar system, a stereoscopic imaging system, and/or the like). In some examples, the expressive vehicle system 2900 obtains the data with at least one processor of the expressive vehicle system 2900. In some examples, the expressive vehicle system 2900 receives the data from a planner module (e.g., the planning module 404 as described with reference to FIG. 4), a perception module (e.g., the perception module 402 as described with reference to FIG. 4), and/or a rule book of the vehicle.

In some embodiments, the expressive vehicle system 2900 determines, at step 2904, an expressive maneuver based on a location of the vehicle in the environment, a location of the at least one object in the environment, and a velocity of the vehicle. In some examples, the expressive maneuver includes a deceleration of the vehicle such that the vehicle stops at least 2 meters away from the at least one object and the vehicle reaches a peak deceleration when the vehicle is at least 30 meters away from the at least one object.

In some embodiments, the expressive vehicle system 2900 generates, at step 2906, data associated with control of the vehicle based on the deceleration associated with the expressive maneuver. In some examples, the expressive vehicle system 2900 evaluates the data associated with the control of the vehicle against at least one rule or preference. In some examples, the expressive vehicle system 2900 evaluates the data associated with the control of the vehicle against at least one rule associated with a road in the environment. In some examples, the expressive vehicle system 2900 receives the at least one rule or preference from a planner or rulebook of the vehicle. In some examples, the expressive vehicle system 2900 evaluates the data associated with the control of the vehicle against at least one passenger comfort preference of a passenger within the vehicle. In some examples, the expressive vehicle system 2900 determines the rate of deceleration based on the at least one passenger comfort preference. For example, if the at least one passenger comfort preference indicates that a passenger within the vehicle is susceptible to motion sickness, the expressive vehicle system 2900 will determine the rate of deceleration while satisfying a deceleration threshold constraint.

In some embodiments, the expressive vehicle system 2900 prioritizes and/or deprioritizes detecting objects based obtained data. For example, if the expressive vehicle system 2900 determines that the pedestrian has just crossed a crosswalk (e.g., by obtaining data about that pedestrian over time), the expressive vehicle system 2900 determines that that particular pedestrian is not likely to walk in the path of the vehicle (e.g., not likely to cross the road again) and the expressive vehicle system 2900 deprioritizes that particular pedestrian compared to other pedestrians. As another example, if the expressive vehicle system 2900 determines that the pedestrian is about to walk into a crosswalk, the expressive vehicle system 2900 determines that the pedestrian is very likely to walk in the path of the vehicle and the vehicle prioritizes that particular pedestrian compared to other pedestrians.

In some embodiments, the expressive vehicle system 2900 communicates intent by communicating an alert to a smartphone associated with a detected object. For example, in the case where the detected object is the pedestrian 1206A shown in FIG. 12, the at least one expressive vehicle system 2900 may push an alert to a smartphone of the pedestrian 1206A to provide a notification to the pedestrian 1206A when it is safe to walk into the path of the vehicle. As a further example, in the case where the detected object is another vehicle (e.g., vehicle 1206C shown in FIG. 12), the expressive vehicle system 2900 may push an alert to a computer of the other vehicle 1206C to let the controller of that other vehicle know (and also the passengers within that vehicle) that the vehicle 1204 is aware of a presence of vehicle 1204C and is giving the other vehicle 1206C the right of way. This is particularly helpful in scenarios when switching lanes with traffic, merging traffic, and four way stop signs where multiple vehicles are stopped and a right of way is not apparent.

In some embodiments, the expressive vehicle system 2900 transmits, at step 2908, the data associated with the control of the vehicle to cause the vehicle to decelerate based on the deceleration associated with the expressive maneuver.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    obtaining, with at least one processor, data associated with an environment, the environment comprising a vehicle and at least one object;
    determining, with the at least one processor, an expressive deceleration profile associated with an expressive maneuver, wherein determining the expressive deceleration profile comprises:
        determining an expressive initiation distance based on a location of the vehicle in the environment and a location of the at least one object in the environment, the expressive initiation distance representing a distance between the location of the vehicle and the location of the at least one object when the vehicle initiates the expressive maneuver,
        determining an expressive maximum deceleration distance based on the location of the vehicle in the environment and the location of the at least one object in the environment, the expressive maximum deceleration distance representing a distance between the location of the vehicle and the location of the at least one object when the vehicle reaches a maximum deceleration,
        determining an expressive stopping distance based on the location of the vehicle in the environment and the location of the at least one object in the environment, the expressive stopping distance representing a distance between the location of the vehicle and the location of the at least one object when the vehicle reaches a stop,
        determining: i) a starting point based on the expressive initiation distance and the location of the at least one object in the environment, ii) a maximum deceleration point based on the expressive maximum deceleration distance and the location of the at least one object in the environment, and iii) a stopping point based on the expressive stopping distance and the location of the at least one object in the environment, and
        determining the expressive deceleration profile based on the starting point, the maximum deceleration point, and the stopping point;
    generating, with the at least one processor, data associated with control of the vehicle based on the expressive deceleration profile associated with the expressive maneuver; and
    transmitting, with the at least one processor, the data associated with the control of the vehicle to a controller of the vehicle for controlling the vehicle to cause the vehicle to perform the expressive deceleration profile of the expressive maneuver.

2. The method of claim 1, wherein determining the expressive stopping distance comprises determining the expressive stopping distance to be at least 2 meters and determining the expressive maximum deceleration distance comprises determining the expressive maximum deceleration distance to be at least 35 meters.

3. The method of claim 1, wherein determining the expressive initiation distance comprises determining the expressive initiation distance to be at least 100 meters.

4. The method of claim 1, wherein determining the expressive deceleration profile comprises determining the expressive deceleration profile based on a velocity of the vehicle.

5. The method of claim 4, wherein determining the expressive initiation distance comprises determining the expressive initiation distance to be a distance representing at least 7.5 seconds driving time away from the location of the at least one object based on the velocity of the vehicle.

6. The method of claim 4, wherein determining the expressive maximum deceleration distance comprises determining the expressive maximum deceleration distance to be at least 35 meters away from the location of the at least one object when the velocity of the vehicle is between 5 m/s and 35 m/s.

7. The method of claim 1, further comprising
    selecting at least one entry condition for initiating the expressive maneuver based on the obtained data associated with the environment.

8. The method of claim 7, wherein selecting the at least one entry condition for initiating the expressive maneuver based on the obtained data associated with the environment comprises:
    selecting the at least one entry condition to comprise a condition requiring that the expressive initiation distance is greater than a minimum initiation distance threshold and a condition requiring that the expressive stopping distance is greater than a minimum expressive stopping distance threshold.

9. The method of claim 8, further comprising:
identifying the at least one object as at least one of a pedestrian, a cyclist, another vehicle, a traffic controller, or a jay-walker based on the obtained data associated with the environment.

10. The method of claim 9, wherein selecting the at least one entry condition for initiating the expressive maneuver based on the obtained data associated with the environment is further based on the identification of the at least one object.

11. The method of claim 10, further comprising:
determining a pose of the at least one object when the at least one object is identified as at least one of the pedestrian, the cyclist, the traffic controller, or the jay-walker,
wherein selecting the at least one entry condition for initiating the expressive maneuver based on the obtained data associated with the environment comprises selecting a condition requiring that the pose of the at least one object is an a direction toward the location of the vehicle.

12. The method of claim 10, further comprising:
determining a location of a crosswalk in the environment based on the obtained data,
wherein selecting the at least one entry condition for initiating the expressive maneuver based on the obtained data associated with the environment comprises selecting a condition requiring that the location of the crosswalk is within a crosswalk distance from the location of the at least one object in the environment.

13. The method of claim 10, further comprising:
determining a clearance distance to another vehicle in front of the vehicle based on the obtained data,
wherein selecting the at least one entry condition for initiating the expressive maneuver based on the obtained data associated with the environment comprises selecting a condition requiring that the expressive stopping distance is less than the clearance distance.

14. The method of claim 7, further comprising:
determining whether all of the at least one entry conditions for initiating the expressive maneuver are satisfied,
wherein transmitting the data associated with the control of the vehicle to a controller of the vehicle for controlling the vehicle to cause the vehicle to perform the expressive deceleration profile of the expressive maneuver is performed in response to determining that all of the at least one entry conditions are satisfied.

15. The method of claim 1, further comprising:
selecting at least one exit condition for terminating the expressive maneuver based on the obtained data associated with the environment.

16. The method of claim 15, wherein selecting the at least one exit condition for terminating the expressive maneuver based on the obtained data associated with the environment comprises:
selecting the at least one exit condition to comprise selecting a condition based on a passage of time after the vehicle has reached a stop at the expressive stopping distance from the at least one object.

17. The method of claim 15, wherein selecting the at least one exit condition for terminating the expressive maneuver based on the obtained data associated with the environment comprises:
selecting the at least one exit condition to comprise a condition based on an indication that the at least one object has not crossed a road of the vehicle.

18. The method of claim 15, further comprising:
determining whether at least one of exit conditions for terminating the expressive maneuver is satisfied; and
responsive to determining whether the at least one of exit conditions is satisfied, transmitting termination data to the controller to cause the vehicle to terminate the expressive maneuver.

19. The method of claim 1, further comprising:
evaluating the data associated with the control of the vehicle against at least one rule or preference.

20. The method of claim 19, wherein evaluating the data associated with the control of the vehicle against at least one rule or preference comprises:
evaluating the data associated with the control of the vehicle against at least one rule evaluating the data associated with the control of the vehicle against at least one rule associated with a road in the environment.

21. The method of claim 1, further comprising:
presenting an expressive indication in a direction toward the at least one object, the expressive indication associated with the expressive maneuver and comprising at least one of an audible indication or a visual indication.

22. The method of claim 21, wherein presenting the expressive indication comprises:
emitting the audible indication using at least speaker of the vehicle, the audible indication comprising a decrease in frequency proportional to the deceleration of the vehicle based on the expressive maneuver.

23. The method of claim 1, further comprising:
controlling the vehicle based on the data associated with the control of the vehicle by controlling a throttle of the vehicle.

24. The method of claim 1, further comprising:
determining an expressive steering profile associated with the expressive maneuver based on the obtained data, the expressive steering profile comprising a steering angle variation.

25. The method of claim 24, wherein determining the expressive steering profile associated with the expressive maneuver comprises:
determining a location of a boundary of a road of the vehicle, the boundary of the road comprising at least one of a lane marking or a curb.

26. The method of claim 25, wherein determining the expressive steering profile associated with the expressive maneuver comprises:
determining the expressive steering profile to comprise a profile that causes the vehicle to steer towards both the boundary of the road and the at least one object.

27. The method of claim 26, wherein determining the expressive steering profile associated with the expressive maneuver comprises:
determining the expressive steering profile to comprise a profile that causes the vehicle to straighten out after steering towards both the boundary of the road and the at least one object such that a direction of travel of the vehicle is parallel with the boundary after steering towards both the boundary of the road and the at least one object.

28. The method of claim 25, wherein determining the expressive maneuver comprises:
determining the expressive deceleration profile to comprise a deceleration such that the vehicle stops along the boundary of the road closest to the at least one object.

29. The method of claim 1, further comprising:
obtaining data representing an intent of the vehicle to change a lane of the vehicle, pick up a passenger, or drop off a passenger.

30. The method of claim 1, wherein the expressive deceleration profile has a higher maximum deceleration magnitude than a non-expressive deceleration profile.

31. The method of claim 1, wherein the expressive maximum deceleration distance is independent from a velocity of the vehicle or is same when the velocity of the vehicle is within a velocity range.

32. A system, comprising:
at least one processor; and
at least one non-transitory computer readable medium comprising instructions stored thereon that, when executed by at least one processor, cause the at least one processor to carry out operations comprising:
obtaining data associated with an environment, the environment comprising a vehicle and at least one object;
determining an expressive deceleration profile associated with an expressive maneuver, wherein determining the expressive deceleration profile comprises:
determining an expressive initiation distance based on a location of the vehicle in the environment and a location of the at least one object in the environment, the expressive initiation distance representing a distance between the location of the vehicle and the location of the at least one object when the vehicle initiates the expressive maneuver,
determining an expressive maximum deceleration distance based on the location of the vehicle in the environment and the location of the at least one object in the environment, the expressive maximum deceleration distance representing a distance between the location of the vehicle and the location of the at least one object when the vehicle reaches a maximum deceleration,
determining an expressive stopping distance based on the location of the vehicle in the environment and the location of the at least one object in the environment, the expressive stopping distance representing a distance between the location of the vehicle and the location of the at least one object when the vehicle reaches a stop,
determining: i) a starting point based on the expressive initiation distance and the location of the at least one object in the environment, ii) a maximum deceleration point based on the expressive maximum deceleration distance and the location of the at least one object in the environment, and iii) a stopping point based on the expressive stopping distance and the location of the at least one object in the environment, and
determining the expressive deceleration profile based on the starting point, the maximum deceleration point, and the stopping point;
generating data associated with control of the vehicle based on the expressive deceleration profile associated with the expressive maneuver; and
transmitting the data associated with the control of the vehicle to a controller of the vehicle for controlling the vehicle to cause the vehicle to perform the expressive deceleration profile of the expressive maneuver.

33. A non-transitory computer readable medium comprising instructions stored thereon that, when executed by at least one processor, cause the at least one processor to carry out operations comprising:
obtaining data associated with an environment, the environment comprising a vehicle and at least one object;
determining an expressive deceleration profile associated with an expressive maneuver, wherein determining the expressive deceleration profile comprises:
determining an expressive initiation distance based on a location of the vehicle in the environment and a location of the at least one object in the environment, the expressive initiation distance representing a distance between the location of the vehicle and the location of the at least one object when the vehicle initiates the expressive maneuver,
determining an expressive maximum deceleration distance based on the location of the vehicle in the environment and the location of the at least one object in the environment, the expressive maximum deceleration distance representing a distance between the location of the vehicle and the location of the at least one object when the vehicle reaches a maximum deceleration,
determining an expressive stopping distance based on the location of the vehicle in the environment and the location of the at least one object in the environment, the expressive stopping distance representing a distance between the location of the vehicle and the location of the at least one object when the vehicle reaches a stop,
determining: i) a starting point based on the expressive initiation distance and the location of the at least one object in the environment, ii) a maximum deceleration point based on the expressive maximum deceleration distance and the location of the at least one object in the environment, and iii) a stopping point based on the expressive stopping distance and the location of the at least one object in the environment, and
determining the expressive deceleration profile based on the starting point, the maximum deceleration point, and the stopping point;
generating data associated with control of the vehicle based on the expressive deceleration profile associated with the expressive maneuver; and
transmitting the data associated with the control of the vehicle to a controller of the vehicle for controlling the vehicle to cause the vehicle to perform the expressive deceleration profile of the expressive maneuver.

* * * * *

UNITED STATES PATENT AND TRADEMARK OFFICE
CERTIFICATE OF CORRECTION

PATENT NO. : 11,738,682 B2
APPLICATION NO. : 17/481018
DATED : August 29, 2023
INVENTOR(S) : Paul Schmitt et al.

Page 1 of 1

It is certified that error appears in the above-identified patent and that said Letters Patent is hereby corrected as shown below:

In the Claims

Column 51, Line 21, in Claim 11, delete "an a" and insert -- a --; and

Column 52, Line 19-21, in Claim 20, after "rule" delete "evaluating the data associated with the control of the vehicle against least one rule".

Signed and Sealed this
Seventh Day of November, 2023

Katherine Kelly Vidal
*Director of the United States Patent and Trademark Office*